United States Patent [19]
Hudson et al.

[11] Patent Number: 5,990,906
[45] Date of Patent: Nov. 23, 1999

[54] UNDO FEATURE FOR A GRAPHICAL PROGRAMMING SYSTEM

[75] Inventors: Duncan Hudson, Austin; Melanie Jensen, Houston; Jeffrey L. Kodosky, Austin, all of Tex.

[73] Assignee: National Instruments Corporation, Austin, Tex.

[21] Appl. No.: 08/914,554

[22] Filed: Aug. 19, 1997

Related U.S. Application Data

[60] Provisional application No. 60/050,761, Jun. 25, 1997.

[51] Int. Cl.$^6$ ........................................... G06F 15/00
[52] U.S. Cl. ............................................................. 345/439
[58] Field of Search ................................... 345/439, 355, 345/356, 357, 127, 131, 433

[56] References Cited

U.S. PATENT DOCUMENTS

| | | | |
|---|---|---|---|
| 4,656,603 | 4/1987 | Dunn | 364/900 |
| 4,813,013 | 3/1989 | Dunn | 364/900 |
| 4,901,221 | 2/1990 | Kodosky et al. | 364/200 |

OTHER PUBLICATIONS

Berlage, Thomas, "A Selective Undo Mechanism for Graphical User Interfaces Based on Command Objects," ACM Transactions on Computer–Human Interaction, vol. 1, No. 3, Sep. 1994, pp. 269–294.

*Primary Examiner*—Phu K. Nguyen
*Attorney, Agent, or Firm*—Conley, Rose & Tanyon; Jeffrey C. Hood

[57] ABSTRACT

An Undo/Redo feature for a graphical programming system which minimizes the required data storage. The graphical programming system includes a plurality of interconnected objects, including fixed size objects and variable size objects. A variable size object is an object which typically changes in size, i.e., grows or shrinks, in response to user modification, whereas fixed size objects do not change in size. When an object is modified by the user, the method of the present invention stores a backup copy for undo purposes. For modification of an object, the backup is performed differently depending on whether the object is a variable size object or a fixed size object. For a variable size object, the method stores the original object as the previous object in the backup list, and the method stores a copy of the original object as the current object in the backup list. For a fixed size object, the method stores a copy of the original object as the previous object in the backup list, and the method stores the original object as the current object in the backup list. For a fixed size object, the original object thus remains as the current or foreground object in the graphical program. Since the original object stays in the foreground, other objects which reference this object maintain their references, and thus are not also required to be backed up. Therefore, the present invention provides a unique system and method for performing undo/redo in a graphical system which minimizes the amount of memory required for undo purposes.

33 Claims, 15 Drawing Sheets

BKUP Heap Structure

UNDO FEATURE FOR A GRAPHICAL PROGRAMMING SYSTEM

PRIORITY DATA

This application claims benefit of priority of U.S. provisional patent application Ser. No. 60/050,761 titled "Undo Feature for a Graphical Programming System" filed on Jun. 25, 1997 whose inventors were Duncan Hudson, Melanie Jensen, and Jeffrey L. Kodosky.

DESCRIPTION OF THE RELATED ART

Traditionally, high level text-based programming languages have been used by programmers in writing applications programs. Many different high level programming languages exist, including BASIC, C, FORTRAN, Pascal, COBOL., ADA, APL, etc. Programs written in these high level languages are translated to the machine language level by translators known as compilers. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

An example of a field in which computer systems are employed to model physical systems is the field of instrumentation. An instrument is a device which collects information from an environment and displays this information to a user. Examples of various types of instruments include oscilloscopes, digital multimeters, pressure sensors, etc. Types of information which might be collected by respective instruments include: voltage, resistance, distance, velocity, pressure, frequency of oscillation, humidity or temperature, among others. An instrumentation system ordinarily controls its constituent instruments from which it acquires data which it analyzes, stores and presents to a user of the system.

Computer control of instrumentation has become increasingly desirable in view of the increasing complexity and variety of instruments available for use. However, due to the wide variety of possible testing situations and environments, and also the wide array of instruments available, it is often necessary for a user to develop a program to control a new desired instrumentation system. As discussed above, computer programs used to control such improved instrumentation systems had to be written in conventional text-based programming languages such as, for example, assembly language, C, FORTRAN, BASIC, or Pascal. Traditional users of instrumentation systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation data. Thus, development and maintenance of the software elements in these instrumentation systems often proved to be difficult.

U.S. Pat. No. 4,901,221 to Kodosky et al discloses a graphical system and method for modeling a process, i.e. a graphical programming environment which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor such that the diagram created graphically displays a procedure or method for accomplishing a certain result, such as manipulating one or more input variables to produce one or more output variables. In response to the user constructing a data flow diagram or graphical program using the block diagram editor, machine language instructions are automatically constructed which characterize an execution procedure which corresponds to the displayed procedure. Therefore, a user can create a computer program solely by using a graphically based programming environment. This graphically based programming environment may be used for creating virtual instrumentation systems and modeling processes as well as for any type of general programming.

Therefore, Kodosky et al teaches a graphical programming environment wherein a user manipulates icons in a block diagram using a block diagram editor to create a data flow "program." A graphical program for controlling instruments or implementing instrumentation functions is referred to as a virtual instrument (VI). In creating a virtual instrument, a user preferably creates a front panel or user interface panel including various controls or indicators that represent the respective input and output that will be used by the graphical program or VI. When the controls and indicators are created in the front panel, corresponding icons or terminals are automatically created in the block diagram by the block diagram editor. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. The data that flows from the controls to the indicators in this manner is referred to as control data. In an instrumentation application, the front panel can be analogized to the front panel of an instrument. The user adjusts the controls on the front panel to affect the input and views the output on the respective indicators.

Thus, graphical programming has become a powerful tool available to programmers. Graphical programming environments such as the National Instruments LabVIEW product have become very popular. Tools such as LabVIEW have greatly increased the productivity of programmers and more and more programmers are using graphical programming environments to develop their software applications. In particular, graphical programming tools are also being used for process control and man machine interface applications.

A common feature in many programs is an "undo" feature which allows a user to undo an action. For example, if a user mistakenly deletes text in a word processing program, the user can select the undo feature to undo the action, thus restoring the text. Undo features are also often provided in various programming text editor tools, as well as various graphics programs.

Graphical programming systems generally allow a user to make a number of different graphical additions, deletions and modifications in creating a graphical program. This is in contrast to textual-based programs, such as word processors and text-based programming editors, where user input primarily comprises the addition, deletion, or modification of text. Therefore, it is considerably more difficult to provide an undo/redo feature in a graphical programming system, due to the graphical nature of user modifications. However, an undo feature is greatly desired because it greatly simplifies the use of a program. Therefore, an undo/redo feature is greatly desired for a graphical programming system. An undo/redo feature is further desired which reduces the amount of memory required for backing up modified objects during transactions.

SUMMARY OF THE INVENTION

The present invention comprises an Undo/Redo feature for a graphical programming system which minimizes the required data storage. The graphical programming system includes a plurality of interconnected objects, wherein the term "object" includes front panel objects such as controls and indicators, and block diagram objects such as terminals, function nodes, structure nodes, icons and other primitives.

The graphical programming system includes fixed size objects and variable size objects. A variable size object is an object which typically changes in size, i.e., grows or shrinks, in response to user modification. Variable size objects essentially comprise lists, which grow and shrink as items are added/removed to/from the list. As its name implies, a fixed size object generally remains fixed in size in response to user modification. Fixed size objects are essentially all objects which are not lists. Examples of fixed size objects include all front panel controls (and indicators) and all function nodes.

When an object is modified by the user, the method of the present invention stores a backup copy for undo purposes. For modification of an object, the backup is performed differently depending on whether the object is a variable size object or a fixed size object. For a fixed size object, the method stores a copy of the original object as the previous object in the backup list, and the method stores the original object as the current object in the backup list. For a fixed size object, the original object thus remains as the current or foreground object in the graphical program. For a variable size object, the method stores the original object as the previous object in the backup list, and the method stores a copy of the original object as the current object in the backup list. The method then sets the copy of the original object to become the current or foreground object, i.e. returns the ObjID of the copy to the graphical program as the new object.

Thus, with a variable size object. the method stores the original or foreground variable size object in the backup list as the previous or background item, and a copy of the variable size object is made which becomes the foreground object used in the graphical program. In contrast, with a fixed size object, the method creates a copy of the original object with identical fields, and the method records that copied object in the background, or as the previous object. The original fixed size object is the one that is actually modified and left in the program as the current or foreground object. Thus, for fixed size and variable size objects, the method operates in an opposite manner regarding which object, the original or copy, is in the foreground and which is in the background.

Fixed size objects are backed up in the above manner because the graphical programming system, e.g., LabVIEW, has objects that are very highly interconnected. In a highly interconnected environment, an object is related to or referenced by one or more other objects, which in turn are each related to or referenced by one or more other objects, and so on. According to the present invention, since the original object stays in the foreground and remains in the same memory location, other objects which reference this object maintain their references. These other objects are unmodified and thus are not also required to be backed up. In contrast, if a copy of a fixed size object were placed in the foreground as a result of an undo backup, the copy would reside in a new memory location, and all objects which referenced this object would be modified and correspondingly would have to be backed up, essentially all the way up the chain to the highest level object in the hierarchy.

The present invention also includes a novel system and method for backing up modifications to elements in an array. When data is being backed up for an array, if the user simply changes a single element in an array, it is undesirable to back up the entire array, which could be a large amount of data. Thus, the present invention includes a mechanism for identifying data backup that is only for a subset of an array. Thus the method is only required to backup a subset of the data of an array and can restore a subset of the data of the array.

When a user modifies an array element, that element will be the only object changed in that data transaction, except when it causes other elements in the array to be created with a default value. According to the present invention, when the user edits an object contained in an array, the method backs up the previous value of the object. The method also records a "data recipe" which describes the subset of the data of the control, indicator or constant containing the object that has been backed up. The data recipe is essentially a description of a subset of an array's data. For each cluster enclosing the modified array element, the recipe contains a single integer that identifies which cluster element contains the modified object. For each array enclosing the modified object, the recipe contains an integer for each dimension of the array that identifies which array element contains the modified object.

The data recipe is used so that the user is not required to back up the entire data of a control, indicator or constant containing an array if the user changes just one element of the array. This greatly reduces the amount of memory required for performing undo/redo on arrays.

Therefore, the present invention provides a unique system and method for performing undo/redo in a graphical system which minimizes the amount of memory required for undo purposes.

DETAILED DESCRIPTION OF THE PREFERRED EMBODIMENT

Incorporation by Reference

The following patents and patent applications are hereby incorporated by reference as though fully and completely set forth herein:

U.S. Pat. No. 4,901,221 titled "Graphic System for Modeling a Process and Associated Method".

U.S. Pat. No. 5,481,741 titled "Method and Apparatus for Providing Attribute Nodes in a Graphical Data Flow Environment".

U.S. patent application Ser. No. 08/292,091 filed Aug. 17, 1994, titled "Method and Apparatus for Providing Improved Type Compatibility and Data Structure Organization in a Graphical Data Flow Diagram".

U.S. Pat. No. 5,475,851 titled "Method and Apparatus for Improved Local and Global Variable Capabilities in a Graphical Data Flow Program".

U.S. Pat. No. 5,497,500 titled "Method and Apparatus for More Efficient Function Synchronization in a Data Flow Program".

U.S. Pat. No. 5,481,740 titled "Method and Apparatus for Providing Autoprobe Features in a Graphical Data Flow Diagram".

U.S. Pat. No. 5,504,917 titled "Method and Apparatus for Providing Picture Generation and Control Features in a Graphical Data Flow Environment"

The present invention provides an undo/redo feature for a graphical programming system. The Undo feature of the present invention allows the user to easily recover from edit mistakes. In the embodiment described below, the undo/redo feature is described as being used in a graphical programming system intended for instrumentation, test and measurement, and process control applications. In the preferred embodiment, the undo/redo feature is comprised in the LabVIEW graphical programming system available from National Instruments. However, it is noted that the undo/redo feature of the present invention may be used for various types of graphical programming systems or graphical systems for various different types of applications. It is further noted that the undo/redo feature of the present invention may be used in other types of systems or applications which include a hierarchy of interconnected objects, as desired.

High-Level Design

In the preferred embodiment, a partial checkpoint implementation of undo is used. This means that any object modified in a transaction is first duplicated before the object is modified. Then, to undo the transaction, all modified objects are replaced with the duplicates created before the objects were modified.

In another embodiment, a scripting-based approach is used in which a script of edits that needs to be applied to undo a transaction are recorded.

Figure 1:
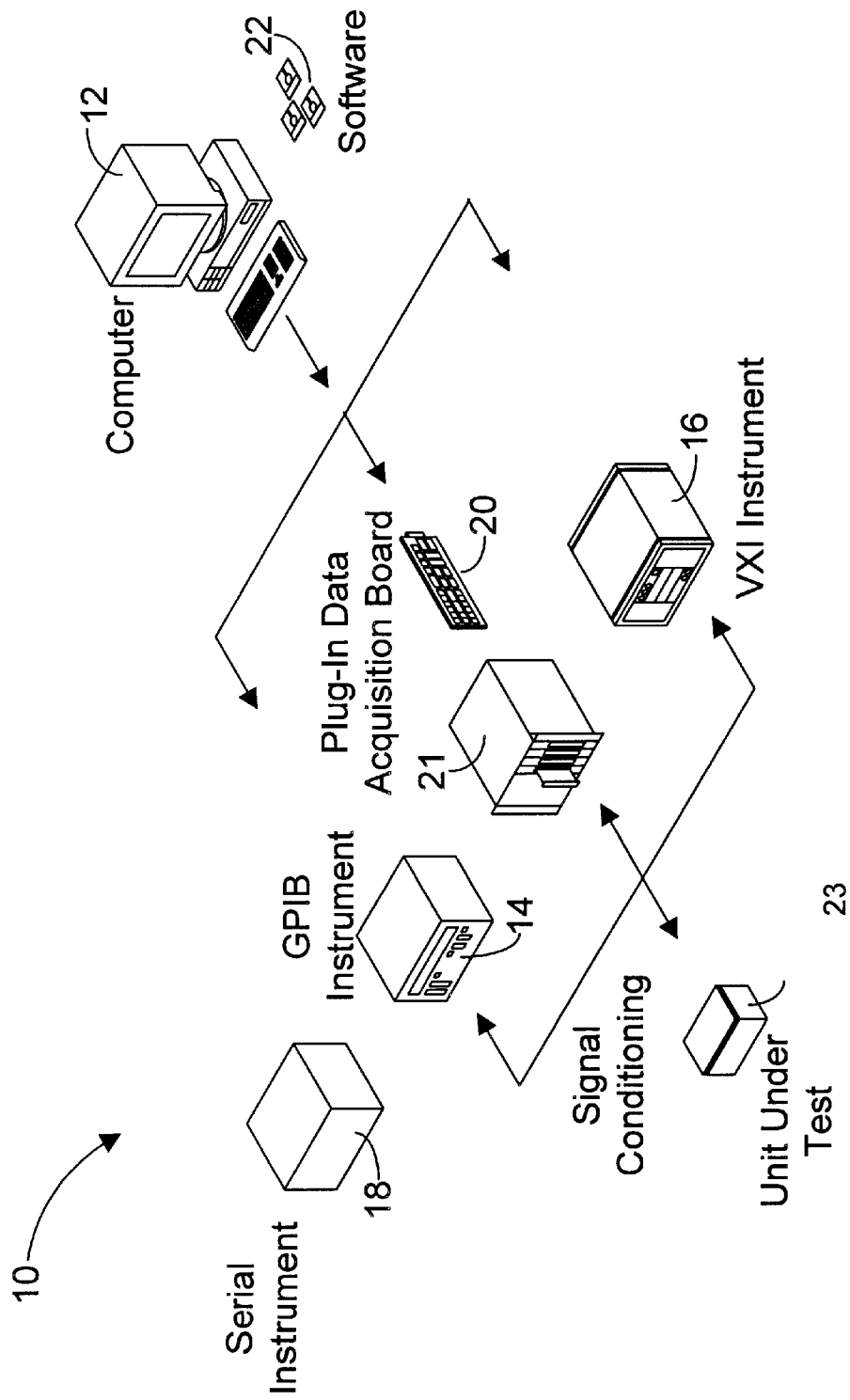
FIG. 1 is an illustration of an instrumentation control system.

FIG. 1—Computer System

Referring now to FIG. 1, an instrumentation control system 10 is shown. The system 10 comprises a computer 12, which connects to one or more instruments. The computer comprises a CPU, a display screen, and one or more input devices such as a mouse or keyboard as shown.

The one or more instruments may include a GPIB instrument 14, a VXI instrument 16, a serial instrument 18 and/or a data acquisition board 20. The GPIB instrument 14 is coupled to the computer 12 via a GPIB interface provided by the computer 12. The VXI instrument 16 is coupled to the computer 12 via a VXI bus or MXI bus provided by the computer. The serial instrument 18 is coupled to the computer 12 through a serial port, such as an RS-232 port, provided by the computer 12. Finally, the data acquisition board 20 is coupled to the computer 12, typically by being plugged in to an I/O slot in the computer such as a PCI bus slot, an ISA bus slot, an EISA bus slot, or a MicroChannel bus slot provided by the computer 12. In typical instrumentation control systems an instrument will not be present of each interface type and in fact many systems may only have one or more instruments of a single interface type, such as only GPIB instruments.

The instruments are coupled to a unit under test (UUT) 23, process or are coupled to receive field signals, typically generated by transducers. The system 10 may be used in a data acquisition and control application, or may instead be used in a test and measurement application. If the system 10 is used in a data acquisition application, the system 10 may also include signal conditioning circuitry 21 coupled between the data acquisition board 20 and transducers.

The instruments are controlled by graphical software programs which are stored in memory of the computer and which execute on the computer 12. The graphical software programs which perform instrumentation control are also referred to as virtual instruments.

The system 10 preferably includes a memory media, such as a non-volatile memory, e.g., magnetic media, a system memory, CD-ROM, or floppy disks 22, on which computer programs are stored. The memory stores a graphical-based program which includes an undo/redo feature according to the present invention. The present invention is thus preferably comprised in a software program stored on a memory and/or hard drive of the computer 12 and executed by a CPU of the computer. In the preferred embodiment, the memory stores a graphical programming system, preferably LabVIEW from National Instruments Corp., which includes the undo/redo feature according to the present invention. The CPU executes code and data from the memory to implement the graphical programming system, and further to implement the undo/redo feature of the present invention. One or more CPUs executing code and data from a memory thus comprises a means for providing an undo/redo feature according to the steps described below.

FIG. 2—Example VI

Figure 2:
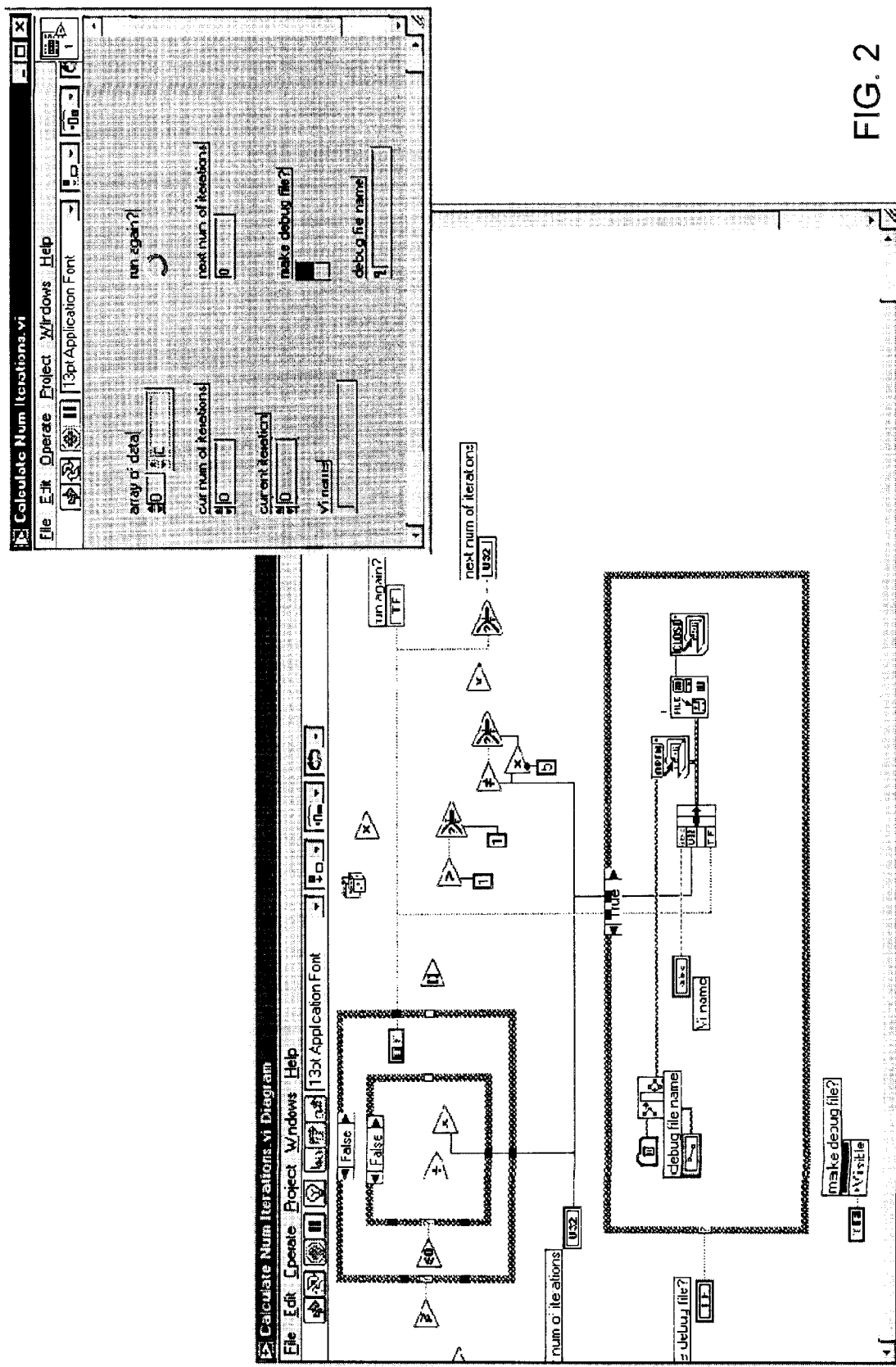
FIG. 2 is a screen shot of an example of a virtual instrument or graphical software program for controlling an instrumentation control system such as in FIG. 1.

FIG. 2 illustrates an example of a virtual instrument or graphical software program in the preferred embodiment. As shown, in the preferred embodiment a graphical program comprises a program or block diagram portion that comprises graphical programming code. The graphical program also preferably includes a user interface portion, referred to as a front panel, which illustrates input/output to/from the graphical program. The front panel is also manipulable by a user to selectively provide input to the graphical program and view the corresponding output. A graphical program or VI also preferably includes a connector pane or other structure which defines the I/O of the program, preferably for enabling the VI or graphical program to be used as a sub-VI or component in another graphical program or VI.

As noted above, the undo/redo feature of the present invention is preferably comprised in the LabVIEW graphical programming system from National Instruments Corporation. The LabVIEW graphical programming system includes a large number of different function nodes, structure nodes, and other graphical programming constructs to which the undo/redo feature of the present invention applies. For more information on the LabVIEW system, please see the patents and patent applications incorporated by reference above.

The following terms are used in the present patent application, and their associated definitions are also provided.

The term "heap" refers to a region of memory that contains objects. For example, each LabVIEW panel or diagram has its own heap to store the objects present in that panel or diagram.

The term "ObjID" refers to a number used to uniquely identify an object. In LabVIEW, an ObjID is an offset into a heap. In other environments, an ObjID could be a pointer or any other value that uniquely identifies an object.

The term "data space" refers to a region of memory that stores data needed at run-time by a virtual instrument (VI). Each LabVIEW VI has its own data space (reentrant VIs may have more than one).

User Interface Considerations

The user interface preferably comprises two menu items and one preference item. The menu items comprise Undo and Redo menu items added to the Edit menu that allow the user to undo and redo the most recently done and undone transaction. These menu items appear as the first items in the Edit menu having the text "Undo xxx" and "Redo xxx", where xxx is a one or two word description of the action taken by the user. The action description is empty when the menu item is grayed out.

The Preferences dialog has a new item: "Minimum number of steps to undo". The user is able to undo/redo any changes made while editing a VI, as well as any data changes made while running a VI, up to a maximum number of steps specified in the Preferences dialog. LabVIEW will guarantee that many steps. If the minimum number of steps is 0, undo is disabled.

Figure 3:
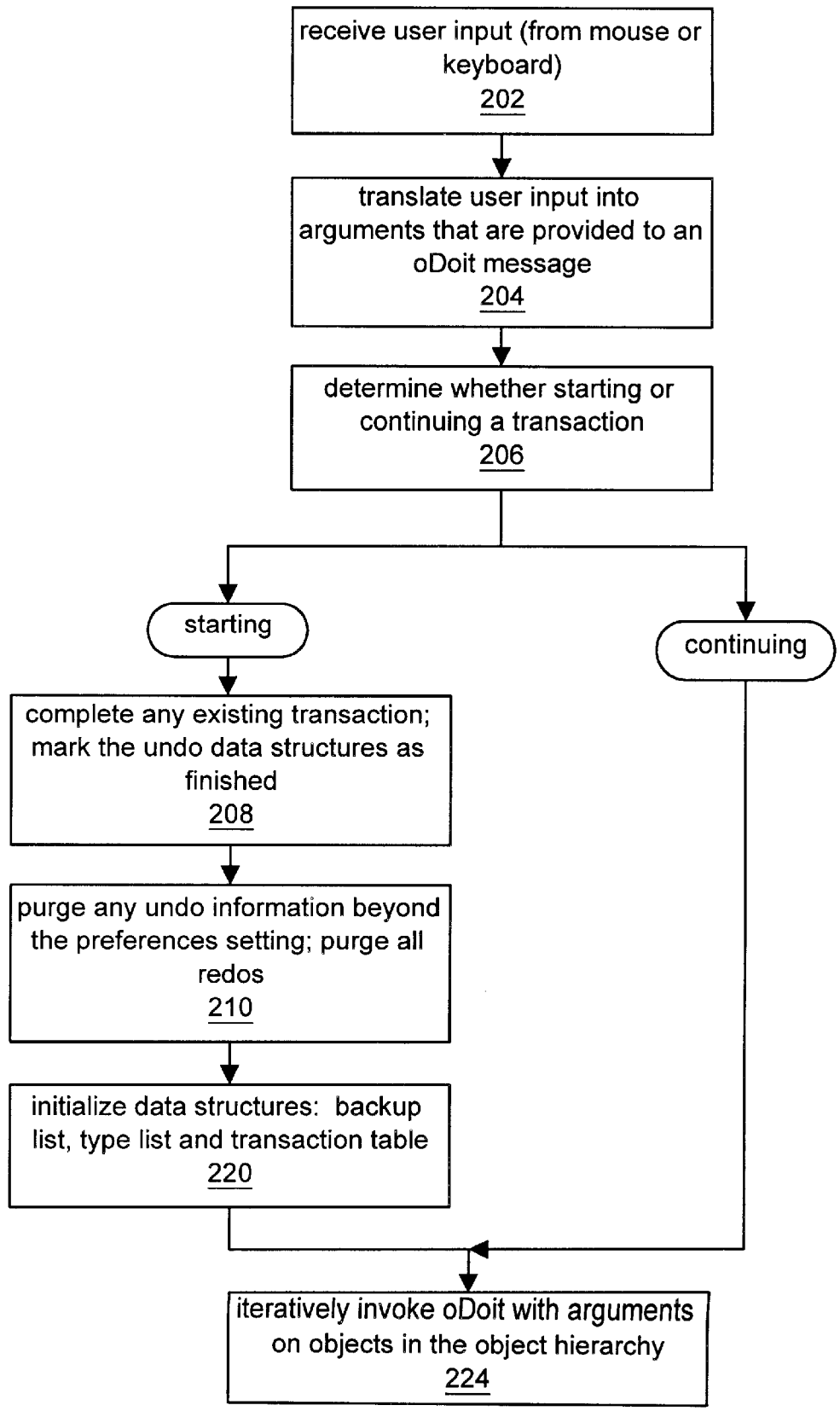
FIG. 3 is a flowchart diagram illustrating operation of the present invention when user input is received to the computer system.

FIG. 3—Flowchart diagram: user enters input into the computer to perform a transaction Referring now to FIG. 3 a flowchart diagram is shown illustrating operation of the method of the present invention when the user provides input to the computer to perform a transaction. As shown, in step 202 the computer system receives input from the user. User input will typically comprise user input to the mouse or to the keyboard of the computer system. However, it is noted the user input mouse can take other forms, such as speech recognition, i.e., audio input into a microphone provided to the computer system, or networked I/O, e.g., scripting commands provided over a network to the computer system.

In step 204 the method operates to translate the user input into arguments that are provided to an ODoit message. In the present invention, the term "ODoit message" refers to a message to an object. The arguments that are provided to the ODoit message include two arguments referred to as the object path and the action. The object path argument specifies the object to which the action is being applied and the hierarchy to reach that object.

The action argument specifies what action is being performed on the object. In the preferred embodiment, the arguments include the object path and action arguments, as well as a data structure comprising other information that is required for the transaction to be performed. For example, in the case of growing an object, i.e. resizing a window or an object, the arguments will also include the new size of the object. In the case of a delete transaction being performed, typically no additional arguments would be required to specify that action.

In step 206, the method determines whether the user is starting or continuing a transaction, i.e., whether the user input is involved with or signifies the start of a transaction, or whether the user input is the continuation of an ongoing transaction, i.e., a transaction that has already received some user input. The determination of whether the user input is the start or continuation of a transaction uses the nature of the user input, as well as a prior determination in this step as to whether the previous user input has completed the transaction. As mentioned immediately above, if the user input is determined to be the continuation of a transaction, the method also determines if this input signifies completion of the transaction. Thus, the method marks the transaction as finished if the transaction is determined to be completed.

For example, if the user input comprises an alphanumeric keystroke and the method determines that the prior user input was an alphanumeric key, the method concludes that this is a continuation of a transaction. This conclusion or decision is made because the preferred embodiment of the method is designed such that the entire text entry into a text entry field is treated as a single transaction. This design choice was made because the graphical programming system of the preferred embodiment has relatively short text entries, and thus it is unnecessary to treat each word as a separate transaction. In alternate embodiments, single alphanumeric keystrokes or single words are treated as individual transactions.

Thus the method uses the information about whether a transaction is marked as finished in determining whether or not the user input in step 206 is the start or continuation of a transaction. For example, if a text data transaction was marked as finished, and a new alphanumeric keystroke input is received. it is necessary to start a new transaction, as opposed to adding it on to the existing transaction. This occurs, for example, where the prior keystroke was an Enter command to terminate data entry into a control, and the user is now entering text into a new control.

After step 206, the graphical programming system has determined whether the user input received is the start of a new transaction or is the continuation of an existing transaction. If the user input is determined to be involved with the start of a transaction, then in step 208 the method completes the existing transaction that was already being performed. This involves marking the Undo data structures involved with the existing transaction as finished. Step 208 is necessary because in many cases the method is only able to determine that a transaction has completed by user input signifying a new transaction has started.

After completing any existing transaction and marking the Undo data structures as finished in step 208, in step 210 the method purges any Undo information which is beyond the Undo limit set in the preference settings. In other words, in step 210 the method examines the maximum number of Undos that the user has set in the preferences setting and purges any Undo information beyond this limit. This operates to limit the amount of memory used for Undo, particularly in situations where the user has limited memory and has chosen to limit the number of transactions that the computer system will store for Undo/Redo purposes. The limit on the maximum number of Undos is preferably set on a per-VI basis. In other words, each VI can have the maximum number of Undos.

Also, in step 210 the method purges all redo information. All Redo information is purged at the start of a new transaction because the method does not support branching. All Redos form an unbroken of sequence of transactions leading to the furthermost Redo. If the method did not purge Redos at this time, then if the user undid the new transaction being started, the method would not be able to determine whether the Redo menu item should redo this transaction or the first Redo transaction that existed prior to the start of this transaction. For example, assume a user moves a control, undoes the move, colors the control without purging redo information for the move transaction, and then undoes the coloring. If the user were to select Redo, it would be unclear what should be redone, the move or the coloring.

In step 220 the method initializes data structures for the new transaction that has started. These data structures include the backup list, the type list, and the transaction table. As discussed further below, the backup list is used for storing a duplicate of the object, the type list is used for storing the types associated with an object, and the transaction table stores global information about the transaction as a whole. e.g., flags indicating whether the transaction has finished or not or whether the data that has been changed in the object, among others.

After operation of steps 208, 210, and 220, operation proceeds to step 224. In addition, if the method determines that the user input is continuing an existing transaction in step 206 then the method proceeds directly to step 224.

In step 224, the method iteratively invokes the oDoit message on objects in the object path of the object hierarchy.

As discussed above, the oDoit message includes arguments based on the received user input. These arguments determine the objects traversed in the object hierarchy. In summary, this step involves traversing top to bottom through the object hierarchy to invoke the oDoit message on each object in the hierarchy between the topmost object in the hierarchy and the object upon which the user input should act, and then repeating the traversal going from bottom to top. Invocation of the oDoit message on each object in the path operates to back up the object prior to the graphical programming system applying the change input by the user. The flowchart of FIG. 4 more clearly illustrates step 224 of iteratively invoking ODoit with the arguments on the objects in the object hierarchy.

Figure 4:
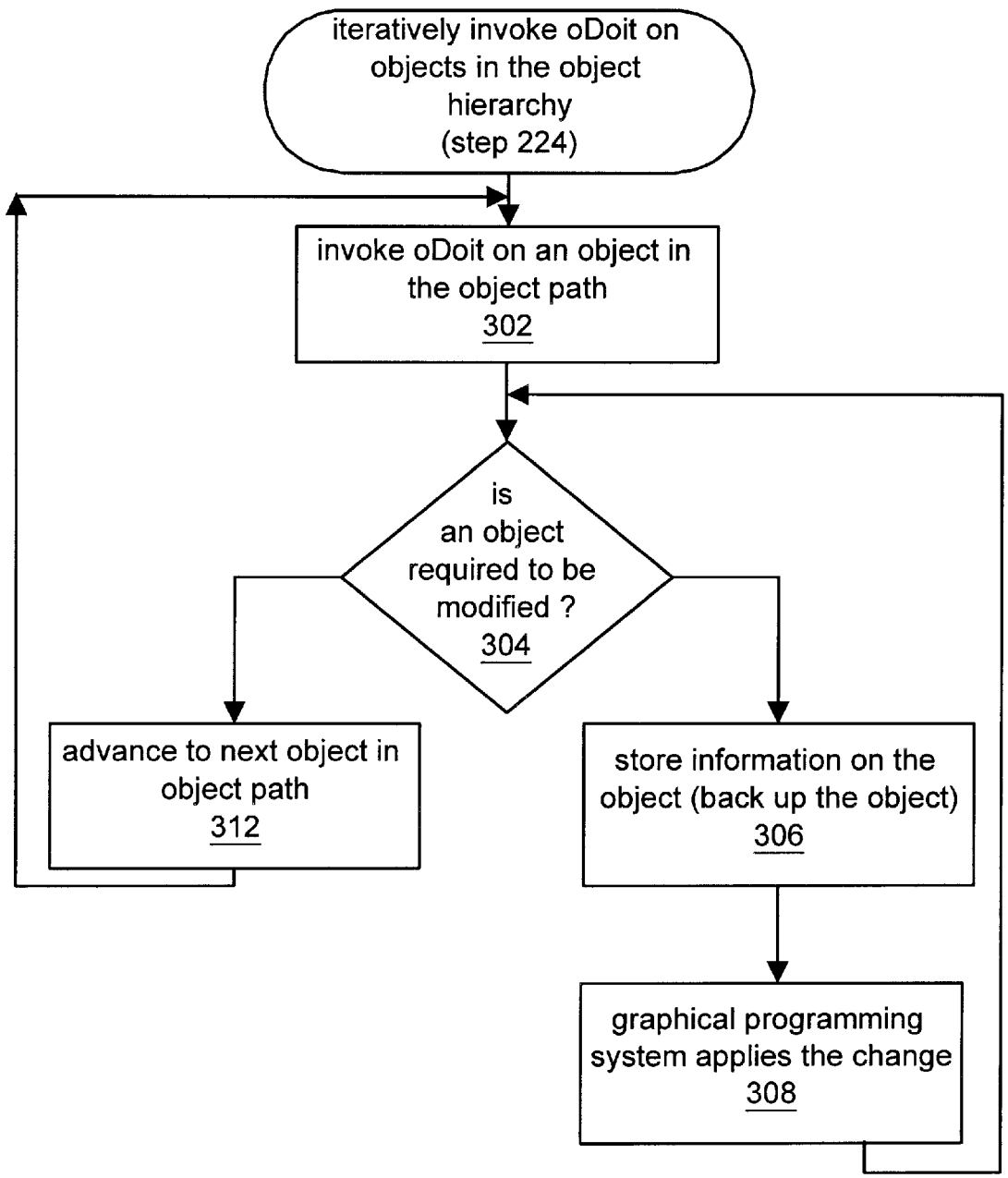
FIG. 4 is a flowchart diagram illustrating iteratively invoking ODoit on objects in the object hierarchy, which is step 224 of FIG. 3.

FIG. 4—Iteratively Invoking oDoit on objects in the object hierarchy

Referring now to FIG. 4, a flowchart diagram is shown illustrating step 224 of FIG. 3 comprising iteratively invoking oDoit on objects in the object hierarchy. The flowchart of FIG. 4 illustrates the operation iteratively invoking oDoit with arguments on objects in an object path of the object hierarchy.

As shown, in step 302 the method invokes oDoit on an object in the object path. In step 304 the method determines if an object in the object hierarchy is required to be modified, i.e., any object in the object path is required to be modified. In the preferred embodiment the method starts at the top of the object hierarchy in the path where the object to be modified resides.

Whenever the method is within an object's oDoit method, the method may modify that object or other objects. Stated another way, the method typically only modifies the object being examined, i.e., the object on which oDoit was invoked in step 302. However, in step 304 the method can determine that other objects are required to be modified in response to invoking oDoit on an object, i.e., other objects are required to be modified in addition to, or instead of, the object being examined. Thus, within an oDoit method, the method of the present invention can modify whatever objects are necessary in order to perform the operation.

If an object is required to be modified as determined in step 304, then in step 306 the method stores information regarding the object, i.e., backs up the object. The operation of storing information regarding an object or backing up the object is shown in more detail in the flowchart of FIG. 5. Here the term "backing up the object" includes saving type information, data information, or storing a copy of the object itself. In step 308 the graphical programming system applies the change to the object. In other words, in step 308 the user input received in step 202 is applied to perform a transaction or change in the graphical program.

The method then returns to step 304 to determine if another object is required to be modified, i.e., if the examination of the object in the object path necessitates changes to other objects not necessarily within the object path. Steps 304, 306, and 308 repeat one or more times for all of the objects required to be modified. Thus, before the graphical programming system is allowed to modify an object, the method must first back up the object. Thus the cycle of steps 304, 306 and 308 represents backing up each object prior to a modification.

If no more objects are required to be modified for the particular object being examined in the object path, then the method advances to step 312. Step 312 is entered when all of the objects required to be modified for a particular object in the object path have been modified, i.e., no more objects remain to be modified for the object on which oDoit was invoked. In step 312 the method advances to the next object in the object path, and operation returns to step 302. Operation thus returns to step 302, an ODoit is invoked on the next object in the object path, and the operation repeats as described.

Objects in the object path are traversed from top to bottom, and then back from bottom to top. In the traversal from top to bottom, the graphical programming system is applied to change any objects in the path including the bottom object. Once the bottom object has been reached, then when the ODoit is completed on a particular object associated with the bottom object, then the method returns to the ODoit of the object one level up in the hierarchy. The method may at that point choose to modify more objects, in which case the method repeats the cycle of backing up objects before they are modified. When this has completed for an object in the traversal from bottom to top, the method returns to the next object up in the object path and again possibly modifies objects, and so on, until the method has traversed from bottom back to the top of the object path. Thus, advancing to the next object in the object path in step 312 comprises traversing the object path from top to bottom and then back from bottom to top.

The traversal by ODoit basically walks through the object hierarchy from top to bottom, primarily visiting the objects in the object path. When the method completes the traversal from top to bottom and begins the traversal from bottom to top, as the method returns from each ODoit to a higher level object on the object path, the method has the opportunity in the ODoit just returned to respond to any changes made by the lower level object.

The method thus determines whether the graphical programming system is modifying an object. If so, the method backs up the object, modifies it, and then determines whether the graphical programming system desires to modify another object in the same oDoit method. If so, the method again backs up the object, modifies it, and then repeats the process until the respective oDoit method has completed modifying objects. Then, the method moves onto the next object in the object path and invokes ODoit on the next object. As described above, this traversal is performed from top to bottom and then from bottom to top.

Figure 5:
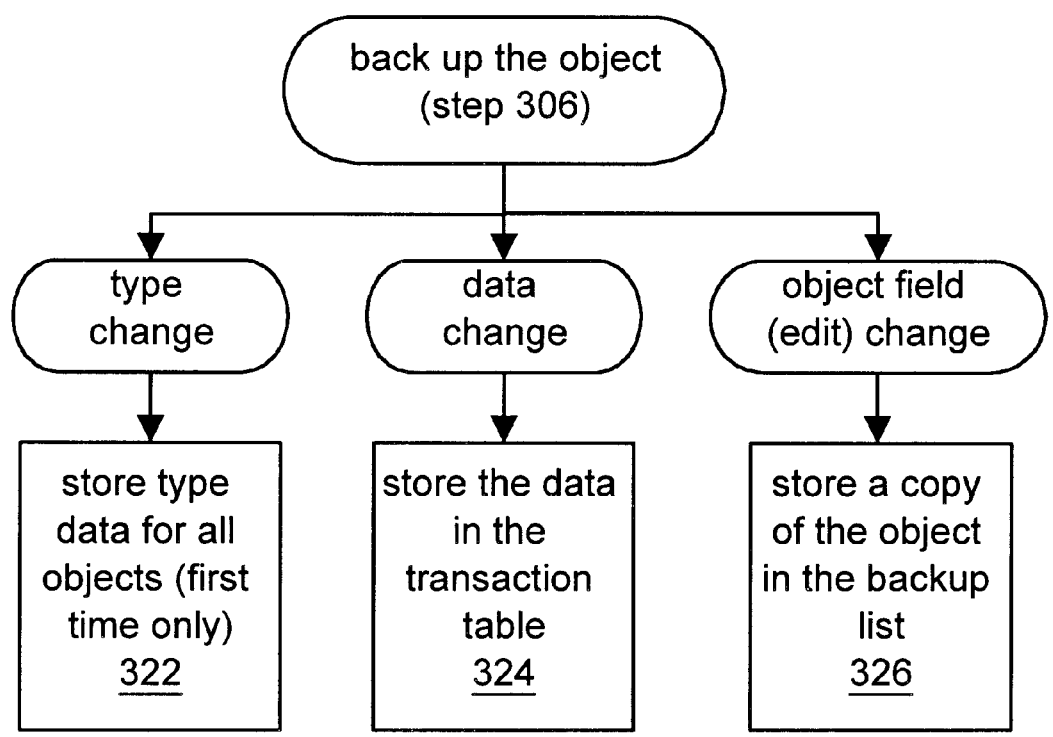
FIG. 5 is a flowchart diagram illustrating backing up of an object, which is step 306 of FIG. 4.

FIG. 5—Backing up an Object

Referring now to FIG. 5, a flowchart diagram is shown illustrating operation of backing up an object in step 306 of FIG. 4.

Step 322—Type Change

As shown, the first time that a type change is made to any object, in step 322 the method stores type data for all objects in the same heap as that object by backing up the type list. An object includes a type ID which is a reference to a type object. A type ID is an index into a structure called the type list, and the type list includes references to type objects. When the method encounters the first object that wants to change type during a transaction, the method actually makes a duplicate of the type list and it places the old type list in the background as the previous type list. Information about the background or previous type list is maintained in a structure called the type list list, which keeps track of all the previous type lists.

After the method has backed up the type list and has a new current type list, when the data type of an object is changed, a new type object is created if necessary, e.g., if a type object with the right type does not already exist. The method then just changes the one slot in the type list to reference the new object. Thus, for regular LabVIEW objects, their reference into the type list never changes. Objects still always have the same slot in the type list, but the object that is referred to by that slot may change.

As discussed further below, when a type change is undone, the method simply swaps the order of the two type lists in the type list list, so that the old types are now the new types and the new types are now previous types for a redo.

Thus, in the preferred embodiment of the invention, the method is not required to store anything for subsequent type changes to objects, since the backup of the type information was globally performed for all objects the first time the type of any object was changed. Backing up the types is thus preferably performed globally once at the beginning of the transaction, rather than piecemeal as the user changes types.

This method of storing type data for all objects the first time any object's type is changed simplifies operation of the present invention and improves performance. This is because the method does not actually backup or make copies of types, but rather simply adds an extra reference to that type object. Thus the "backup process" does not involve copying an object, but rather merely adding a new set of references, e.g., basically creating a list referred to as the type list that refers to these type objects. The method is thus not required to duplicate any of the type objects. The graphical programming system then periodically performs garbage collection where it walks through all of the type objects through their references, and if it does not find a reference to a particular type object, the system simply disposes of the type object. This essentially eliminates a number of the backups that the graphical programming system would be required to do during an oDoit, because the types are already saved.

Step 324—Data Change

As shown, for a data change, the method stores the data in the transaction table in step 324. A data change generally involves the data that the user sees, e.g., the value of a number or a front panel control. In the case of a data change, an object maintains a reference to the data, wherein the reference is an offset in a structure referred to as the data space. Thus, when the data changes, a portion of the data space actually changes, and the method only back ups the part of the data space that changes. Thus a data change is not considered an edit change because the reference to where the data resides in the object does not change. Thus no field in the object actually changes.

When the data value of an object is about to be changed, the method calls a function to backup its data, called BkUpDSObject. The BkUpDSObject function makes a copy of the original value of the data and it records it into an external structure called the backup heap. The backup heap includes several objects that keep track of information about the data that is being backed up, the current transaction, and the type of data that is being backed up. It is necessary to keep track of the type of data being backed up because the method may back up just text that the user has typed in or the method might back up a numeric value, or an entire cluster's worth of data. Thus the backup heap keeps track of the size of the data and what transaction the data is for.

Step 326—Edit Change

For an object field change, also referred to as an edit change, the method stores a copy of the object in the backup list in step 326. An object field or edit change is discussed more fully with respect to FIG. 6 below.

Figure 6:
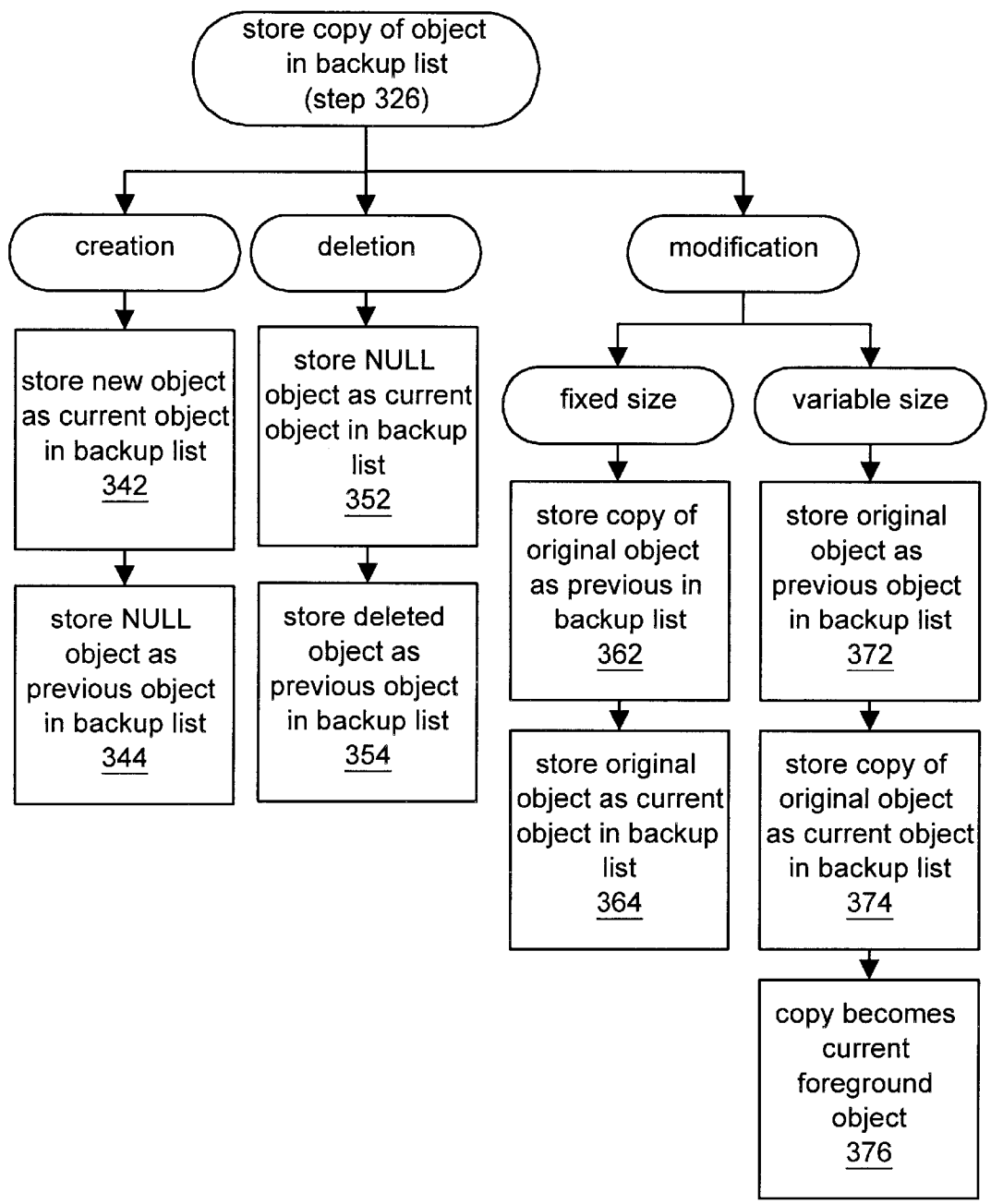
FIG. 6 is a flowchart diagram illustrating storing a copy of an object in the backup list, which is step 326 of FIG. 5.

FIG. 6: Backing up an object—Edit Change

Referring now to FIG. 6, a flowchart diagram is shown illustrating operation of storing a copy of an object in step 326 of FIG. 5 in response to an edit change or object field change. As shown, an edit change can comprise either a creation of an object, deletion of an object, or modification of an object. In the preferred embodiment, the method uses a backup list for each transaction for backing up an object in response to an edit change. The backup list is a list added to the heap structure for undo/redo purposes. The backup list is used to record a copy of the original state of each object in the heap that changes during a transaction. The backup list comprises a list of pairs of entries for each transaction, more specifically a list of pairs of ObjIDs. The entries in each pair are referred to as current and previous entries, also referred to as foreground and background entries. The method also maintains a backup list list which references each of the backup lists in the order in which they were created.

For creation of an object, the method stores the newly created object as the current object in the backup list in step 342. In step 344 the method stores the NULL object (NULL) as the previous object in the backup list.

For deletion of an object, the method stores the NULL object as the current object in the backup list in step 352. In step 354 the method stores the deleted object as the previous object in the backup list.

For modification of an object, the strategy for keeping a backup differs depending on whether the object is fixed size or variable size. In other words, the manner in which object backup is performed for a modification is slightly different depending on whether or not the object is a variable size object or a fixed size object. A variable size object is an object which typically changes in size, i.e., grows or shrinks, in response to user modification. Variable size objects essentially comprise lists, which grow and shrink as items are added/removed to/from the list. As its name implies, a fixed size object generally remains fixed in size. Fixed size objects are essentially all objects which are not lists. Examples of fixed size objects include all front panel controls (and indicators) and all function nodes. As an example, a growable attribute node is considered to be a fixed size object. A growable attribute node owns a list of terminals, and the list of terminals is a variable size object. Thus, well over 95% of the objects in LabVIEW are fixed size objects.

As shown, for a fixed size object, in step 362 the method stores a copy of the original object as the previous object in the backup list. In step 364 the method stores the original object as the current object in the backup list. For a fixed size object, the original object thus remains as the current or foreground object in the graphical program.

For a variable size object, in step 372 the method stores the original object as the previous object in the backup list. In step 374 the method stores a copy of the original object as the current object in the backup list. In step 376 the method sets the copy of the original object to become the current or foreground object, i.e. returns the ObjID of the copy to the graphical program as the new object.

Thus, with a variable size object, the method stores the original or foreground variable size object in the backup list as the previous or background item, and a copy of the variable size object is made which becomes the foreground object used in the graphical program. Stated another way, when a variable size object is backed up, a new object is created, and that new object is placed in the foreground, and the original object goes into the background as the stored object for undo purposes.

In contrast, with a fixed size object, the method creates a copy of the original object with identical fields, and the method records that copied object in the background, or as the previous object. The original fixed size object is the one that is actually modified and left in the program as the current or foreground object. Thus, for fixed size and variable size objects, the method operates in an opposite manner regarding which object, the original or copy, is in the foreground and which is in the background.

The reason why fixed size objects are backed up in the above manner is because the graphical programming system, e.g., LabVIEW, has objects that are very highly interconnected. In a highly interconnected environment, an object is related to or referenced by one or more other objects, which in turn are each related to or referenced by one or more other objects, and so on. Thus, if a copy of a fixed size object were placed in the foreground as a result of an undo backup, all objects which referenced this object would be modified and correspondingly would have to be backed up, essentially all the way up the chain to the highest level object in the hierarchy.

The chart below summarizes the contents of the back up list when edits are made to an object:

|  | Current | previous |
|---|---|---|
| fixed sized object | O | copy of O |
| variable sized object | copy of O | O |
| created object | O | NULL |
| deleted object | NULL | O |

During a transaction each object that changes adds or updates an entry in the backup list. The term "current" refers to the ObjID of the object at the end of the transaction and the term "previous" is:

a) (fixed sized object) the ObjID of a copy of the object at the start of the transaction b) (variable sized object) the ObjID of the object at the start of the transaction c) NULL if the object was created during the transaction.

It is noted that fixed and variable sized objects are handled the same for creation and deletion.

Undo or Redo is accomplished by block swapping the contents of the current and previous objects (case a) or by swapping the current & previous fields (cases b&c).

This scheme works because fixed size objects are never reallocated during a transaction, but rather stay in the same memory location. Objects that point to reallocated variable size objects are considered changed by virtue of the fact that the field containing the ObjID has changed. Thus objects which reference a modified variable size object are also modified and are required to be updated.

To illustrate the advantages of the present invention, assume that fixed size objects were backed up in the opposite manner like variable size objects (NOT according to the invention). In this case, when the fixed size object is backed up, the copy of the object is placed in the foreground, typically at a new memory location. The graphical programming system references objects by an object ID or pointer. In this case, since a copy of the object is now placed in the foreground, the value that references that object will be different because the copy of the object is now at a new different memory location than the original object. This means that any objects that have a reference to this object, referred to as referencing objects, will have to modify a field in themselves, because these referencing objects are now referring to the new object. This means that those referencing objects which reference the object will also have to be backed up, because one of their fields is being modified. Thus, using this method, the method would be required to back up all the way up to the top level object in the hierarchy whenever any object was changed. This would be unduly burdensome and require large amounts of memory and processing time for simple transactions.

Therefore, in the preferred embodiment, when a fixed sized object is being backed up, the newly created object is the one that goes into the background, and the original object stays in the foreground and is modified. Since the original object remains at the same memory location, no referencing objects are required to be modified. Accordingly, no other object is required to change its reference to the object, and no further backups are required.

With variable size objects, the object in question will typically grow or shrink. Thus it is likely that the variable size object will be required to move its position in memory, thus changing the object ID or pointer value by which other objects refer to it. Thus, for variable size objects, it is more efficient to take the current or original object, place it in the background, and then create a new object for placement in the foreground. In this case, the graphical programming system is required to update all objects which have references to that object.

FIG. 8—Example

Figure 8:
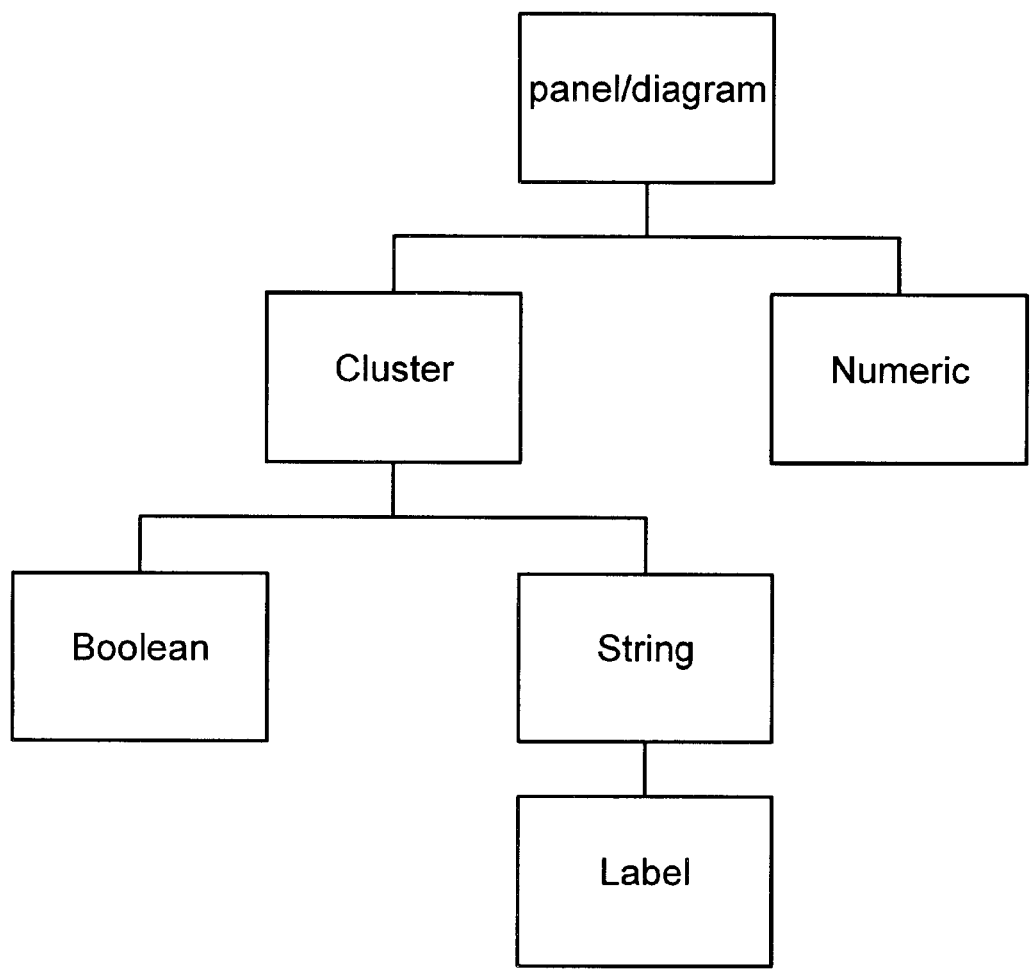
FIG. 8 illustrates an object hierarchy.

FIG. 8 illustrates a hierarchy of objects upon which an edit is performed, wherein the object hierarchy is used to explain the operation of backing up objects. Here presume that the user deletes a Boolean from inside of a cluster. The Boolean, which is a fixed size object, simply moves into the background, and null is placed in the foreground in the backup list to indicate that the item was deleted. The cluster includes a list of all of the data elements inside the cluster. The cluster list is required to be modified by removing an element from the list. When this is done, the list, which is a variable size object, is backed up. The new smaller list is now in the foreground and the original list would be in the background. By changing that list, the method is required to back up all objects which refer to the object, which in this case is the cluster, which is a fixed size object. Thus a copy of the cluster is made, and the copy is placed in the background. The original cluster stays in the foreground and accepts a new list. However, since the cluster object did not change the way that it is referenced, i.e., did not change its ObjID, it is not necessary to back up objects any further up the chain to any other objects that have a reference to the cluster object. Thus it is only necessary to backup to the first fixed size object in the reference chain.

FIG. 7—Undo/redo

Figure 7:
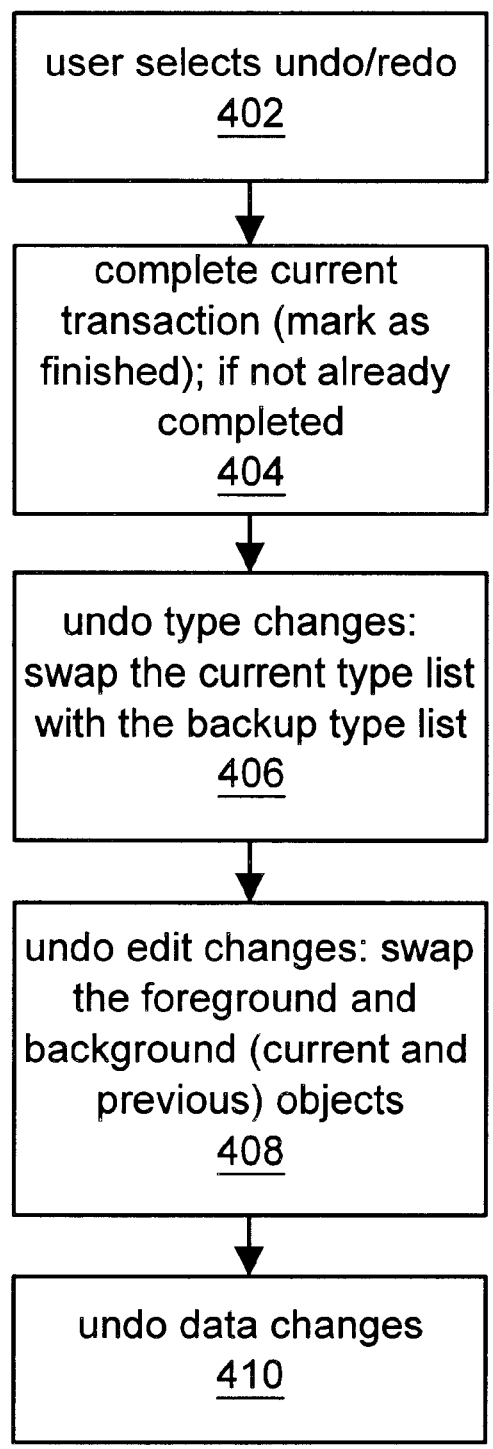
FIG. 7 is a flowchart diagram illustrating operations when a user selects undo/redo.

FIG. 7 illustrates operation when the user elects to undo/redo an object. As shown, in step 402 the user selects the undo or redo option. The following describes the steps for the undo option, it being noted that the reverse is performed for a redo operation.

In step 404 the method completes the current transaction by marking it as finished, if the current transaction is not already completed.

In step 406 the method undoes type changes by swapping the current type list with the backup type list.

In step 408, the method undoes edit changes. Object changes are handled slightly differently for creation and deletion, and for object changes to fixed size and variable size objects. For creation and deletion of either type of object, and for modification of variable size objects, the method swaps the entries in the backup list so that what was in the background slot is now in the foreground slot and what was in the foreground slot is now in the background slot. For fixed size objects since the original object was kept in the foreground and the new object placed in the background, instead of swapping the entries in the backup list, the method actually swaps the contents of the objects. Thus the fixed size objects remain in the same memory location and their contents are swapped.

In step 410 the method undoes data changes. Undoing a data change is fairly simple. As noted above, the original data was recorded in the transaction table, in the entry associated with this transaction. Thus the method takes the data from that transaction table and swaps it with the data that is currently in the foreground.

Committing or Disposing a Transaction

To keep the memory used by Undo from growing infinitely, the user specifies a constant number of transactions to be undoable. Once the number of steps reaches that constant, one transaction is committed from the front of the list every time one transaction is added to the end of the list. This scenario uses an unspecified amount of memory, but the user can rely on being able to undo a certain number of steps. In other embodiments, the user is allowed to specify an absolute amount of memory or a percentage of a VI's memory to be used by Undo, but we rejected these because they are too complicated for the user and don't guarantee any number of steps of undo.

When a VI runs out of memory and is unable to expand its heaps enough to finish the transaction, the transaction is aborted. In other embodiments, the method commits the backups for previous transactions even though this goes below the minimum number of transactions OR displays a dialog to allow the user to continue without undo. The amount of memory used by Undo is displayed in the About LabVIEW dialog.

Committing a transaction involves disposing the transaction's entry in the transaction table in the backup heap, disposing the backup list and all objects identified by all previous ObjIDs in the backup list (if the transaction involved an edit change), and disposing the type list (if the transaction involved a type change). After a commit, the panel and diagram heaps and the backup heap should be compacted to recover the space used by these objects that have been disposed.

Data Structures

For each transaction involving an edit change, each heap has its own backup list. Thus, the front panel has a backup list and the block diagram has a backup list. The first time an object is backed up in an edit transaction, new backup lists are created. A backup list list for each heap maintains those lists. The backup list list is an array of all the backup lists for the heap and maintains the ordering and time of the backup lists. The backup list list has an entry for every transaction that performed an edit.

The backup list, the backup list list, and backup objects all reside in the same heap as the original object. Thus there is a backup list for the block diagram and a backup list for the front panel.

The type list list has one entry for every transaction that changes types, much like the backup list list for edits. The first time a type is changed in a transaction, a new type list is created. A type list list for each VI maintains those lists. The type list list is an array of all the type lists for the VI and maintains the ordering and time of the type lists. The type list list has an entry for every transaction that performed a type change.

The type list, type list list, and type objects all reside in a separate pool of memory called the type heap.

The transaction table has an entry for every transaction, whether the transaction is an edit, a type change, or a data change.

The backup heap contains the transaction table and it also contains all the data backups. Thus whenever memory space is allocated for a data backup, the space goes in the backup heap.

Each VI includes one transaction table and one type list. There is one backup list per heap. Thus the front panel and the block diagram each have their own backup list, and the total of the Undo information for a VI is the sum of its transaction table, its type list and the backup list on both its front panel and its block diagram.

It is noted that these structures can be allocated in various ways, as desired.

Figure 9:
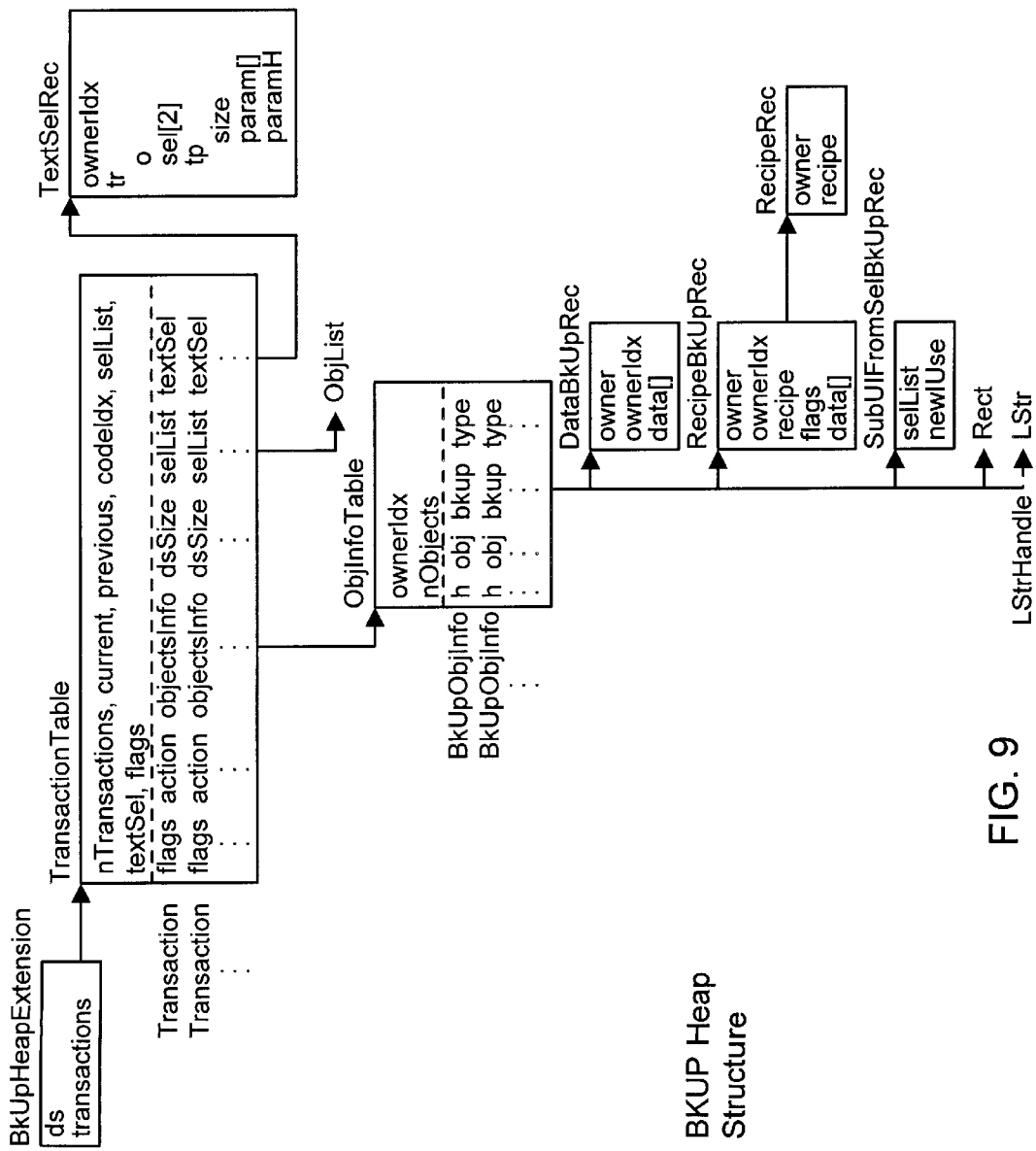
FIG. 9 illustrates the backup heap data structure.

FIG. 9—Backup Heap Structure

FIG. 9 illustrates the structure for the backup heap. The following describes the various fields in the backup heap structure.

1. Transaction Table fields

NTransactions—number of transactions in the Transaction Table current—index into the table of the transaction that is currently in progress, or, if there is no transaction in progress, it is the index of the transaction that will be undone when the user selects "undo" from the edit menu.

previous—index into the table of the transaction that comes before the current transaction chronologically. Normally it will be current−1. However, if a transaction is in progress and there are Redo transactions in the list, the transaction in progress will be at the end of the list, with the previous transaction somewhere in the middle and redo transactions in between. When the current transaction is finished and if it isn't empty, the redo transactions will be committed, the current transaction will take their place, and current will be set to previous+1.

codeIdx—index of transaction at whose end the code is good. In other words, the VI was compiled after this transaction took place. The compiled code may still be valid for several transactions before and after, depending on what happened in those transactions.

selLxist—currently not used textSel—ObjID of TextSelRec which remembers what the selection should be after the last transaction (i.e. when there are no Redo transactions). The ownerIdx of that TextSelRec will be kMax32.

flags—only flag defined so far is kTTSelRecForFP, which corresponds to the transaction flag kSelRecForFP, but applies to the TransactionTable's TextSelRec (textSel).

2. Transaction fields flags—Includes flags which specify what the transaction has backed up, for example: object (edit) changes, type changes, operate data, default data, private data, text, etc.

action—The value is a general description of what type of action the transaction was, for example, move, create, color, etc. objectsInfo—ObjID of ObjInfoTable dsSize—size of the data space before this transaction began selList—currently not used, but intended to be a list of objects that were selected at the beginning of this transaction.

TextSel—ObjID of the TextSelRec that describes the text selection at the beginning of this transaction.

3. TextSelRec fields

The TextSelRec remembers what text was hilited at the beginning of a transaction.

OwnerIdx—The index of the transaction to which this TextSelRec belongs. If this is the TextSelRec belonging to the XTransaction° Fable, its ownerIdx will be kMax32.

Tr—a TextRecipe which specifies the selection in a particular piece of text. It is built by oBuildTextRecipe and used by oFindHilite.

Tr.o—ObjID of the object that has text selection at the beginning of the transaction tr.sel—the beginning and end of the selection tr.tp—TextParams, the parameters needed to specify a particular instance of tr.o tr.tp.size—the number of parameters tr.tp.param—an array of kMaxFindHilite int32s tr.tp.paramH—a handle to more int32s, which is allocated when the number of parameters is greater than kMaxFindHilite 4. ObjInfoTable fields ownerIdx—index of the transaction to which this ObjInfoTable belongs nObjects—number of BkUpObjInfo records in the table.

5. BkUpObjInfo fields h, obj—heap and ObjID of the object whose data is backed up bkup—ObjID of information about backed up data. The structure at bkup depends on type. See table.

Type—type of backed up information

| BkUpObjInfo.type | BkUpObjInfo,bkup | what is backed up? | Special |
|---|---|---|---|
| >0 (TypeID) | ObjID of DataBkUpRec | operate or default data | |
| kuVIFlags | ObjID of DataBkUpRec | undoable VI fields | h == NULL, obj == vi |
| kuRecipe | ObjID of RecipeBkUpRec | recipe to nested data (inside array or cluster) | |
| kuText | LstrHandle | label's string | (h, obj) is label |
| kuPanelBounds | ObjID of Rect | HeapPanelRect | |
| kuSubVIFromSel | ObjID of SubVIFromSelBkUpRec | new subVI information | obj == 0 |
| <= kuPrivate | ObjID of DataBkUpRec | object's private data | |
| Others to be added as needed | . . . | . . . | . . . |

6. DataBkUpRec fields owner—ObjID of ObjInfoTable which contains the BkUpObjInfo to which this DataBkUpRec belongs.

ownerIdx—index in ObjInfoTable of the BkUpObjInfo to which this DataBkUpRec belongs.

data—the actual backed up data

7. RecipeBkUpRec fields owner, ownerIdx—same as DataBkUpRec recipe—ObjID of RecipeRec that specifies a particular subset of (h. obj)'s data flags—For a complete list, search undop.h for krArrayElement. The only other flag presently defined is krArrayShape.

data—the actual backed up data

8. SubVIFromSelBkUpRec fields selList—list of objects that become part of the new subVI newIUse—IUseNode of the new subVI Backing up data for arrays When data is being backed up for an array, if the user simply changes a single element in an array, it is undesirable to back up the entire array, which could be a large amount of data. Thus, the present invention includes a mechanism for identifying data backup that is only for a subset of an array. Thus the method is only required to backup a subset of the data of an array and can restore a subset of the data of the array.

When a user modifies an array element, that element will be the only object changed in that data transaction, except when it causes other elements in the array to be created with a default value. These two cases will be special types of backup records, ArrElt and ArrSize. An ArrElt record stores the offset and value of the typed-in element. An ArrSize record stores the array size information as well as the offset and value of the typed-in array element.

In any case, when the user edits an object contained in an array, the method backs up the previous value of the object. It also records a "data recipe" which describes the subset of the data of the control, indicator or constant containing the object that has been backed up. For each cluster enclosing the modified array element, the recipe contains a single integer that identifies which cluster element contains the modified object. For each array enclosing the modified object, the recipe contains an integer for each dimension of the array that identifies which array element contains the modified object.

For example, assume that we have a control consisting of a cluster, wherein the cluster comprises a numeric, a string, a two-dimensional array of numerics having two rows and three columns, and a Boolean. If a user modified the numeric in the array at index (0, 1), the method would back up the data of that element along with the data recipe (2, 0, 1), which would indicate that the backed up data is for element 2 (the array) of the cluster at index (0, 1).

A data recipe is a description of a subset of an array's data. The data recipe is used so that the user is not required to back up the entire data of a control, indicator or constant containing an array if the user changes just one element of the array.

Multiple VI undo.

The above data structures are maintained on a per VI basis, so each VI actually has a transaction table, each VI's front panel has a backup list and a backup list list, and it's block diagram heap has the same structures. Each VI also has a type list list and a type list. Thus each VI is capable of keeping track of its own transaction information, which means that there can be several undos or redos pending on one VI and still have several undos and redos pending on another VI. The preferences setting for how many steps of undo is maintained on a per VI basis. Thus, if the preferences setting is ten steps of undo, every VI can record up to 10 steps of undo. The only point at which VI's interact with each other in terms of keeping track of undo is if the VI changes as part of a transaction to its interface, which is the way that the VI appears to anyone who wants to use the VI. For example, if the user changes the type of a control on a connector pane, or changes the connector pane pattern, then all of the callers are automatically updated to use that new calling information. As part of that process of automatically updating, all of the callers are directed to throw away their undo information. This is necessary to avoid inconsistencies between the caller's undo information and the changes forced to be applied from the callee.

Multistep Undo

As described above. in order to implement a multistep undo, in addition to the backup list, a heap also has a backup list list. The backup list list contains the ObjIDs of each backup list. Since the heap extension object owns the backup list and the transaction's action code, it is backed up during each transaction. Therefore, a heap extension exists for every transaction. Thus the current transaction is the one whose backup list is pointed to by the current heap extension. When the current transaction is undone, its heap extension is swapped with the backup extension, which causes a new backup list to become the current list. Any transaction whose backup list is before the current one in the backup list list is a transaction that is waiting to be undone. Any transaction whose backup list is after the current one in the backup list list is a transaction that is waiting to be redone. Transactions waiting to be redone are thrown away when a new transaction is started by the user. When transactions are committed, the oldest transaction is committed first, as discussed in Example 2 below.

Reentrant VIs

Reentrant VIs have a dataspace clone for every time they are called. Since each dataspace has a handle to its own backup heap, the VI gets a new dataspace backup heap whenever it gets a new dataspace. This is necessary, since it would not make sense to undo a value change that was done on a different dataspace. The alternative is to not be able to undo in alternative dataspaces.

Transactions that affect more than one VI

In the preferred embodiment, the system allows more than one VI to have undo at a time. Each VI keeps track of its own undo information in its own backup heap.

In an alternate embodiment, only one VI is undoable at a time. Most transactions only have an effect on the VI that was edited, but there are a few that affect other VIs too, such as connector pane changes and typedef changes. Global changes are a problem because if they are undone in one place, they must be undone in the other in order to keep the VIs consistent. However, there may be later transactions in one or more of the VIs that need to have the global change undone. Or it may have been committed already. To prevent this type of inconsistency between VIs, in one embodiment only the current VI is Undoable. When the user starts to edit a new VI, all of the backup information for other VIs in memory is disposed. Though at first this seems restrictive, it is only a problem when the user is repeatedly switching between VIs. What is more common is for a user to edit one VI for a while before switching to another one. When a global change is made, it is backed up in all of the affected VIs. The change is marked as a global change in the current VI so that LabVIEW knows to undo it in other heaps when it is undone in the current one. Since not all VIs will be affected by all global changes, this embodiment includes a way to know which VIs are affected by which change. In one embodiment, a transaction is begun in every VI whenever there is a global change. However, this is wasteful. In another embodiment, each global change is assigned a unique ID which is stored in the heap extension object, which is unique to each transaction. Then, when a global change is undone in the current heap, undo is also performed in all heaps that have that global change. The same operations occur for redo and commit.

Only in a few circumstances does editing one VI, call it A, cause undo information on another VI, referred to as B, to have to be thrown away. Examples of these circumstances are provided below, where A and B are both VIs, and the B VI uses the A VI as a sub-VI.

B uses A and:

1. A is a standard VI, and you change the type of a control/indicator that is on the connector pane of A.
2. A is a typedef VI, and you change the type of A.
3. A is a strict typedef VI, and you change the type or appearance of A.
4. A is a global VI, and you change the type of a control/indicator of A that is used by B.

EXAMPLE 1

Figure 10:
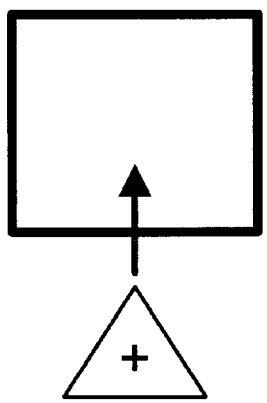
FIG. 10 illustrates a simple adopt and disavow example of moving a primitive into a structure.
Figure 11:
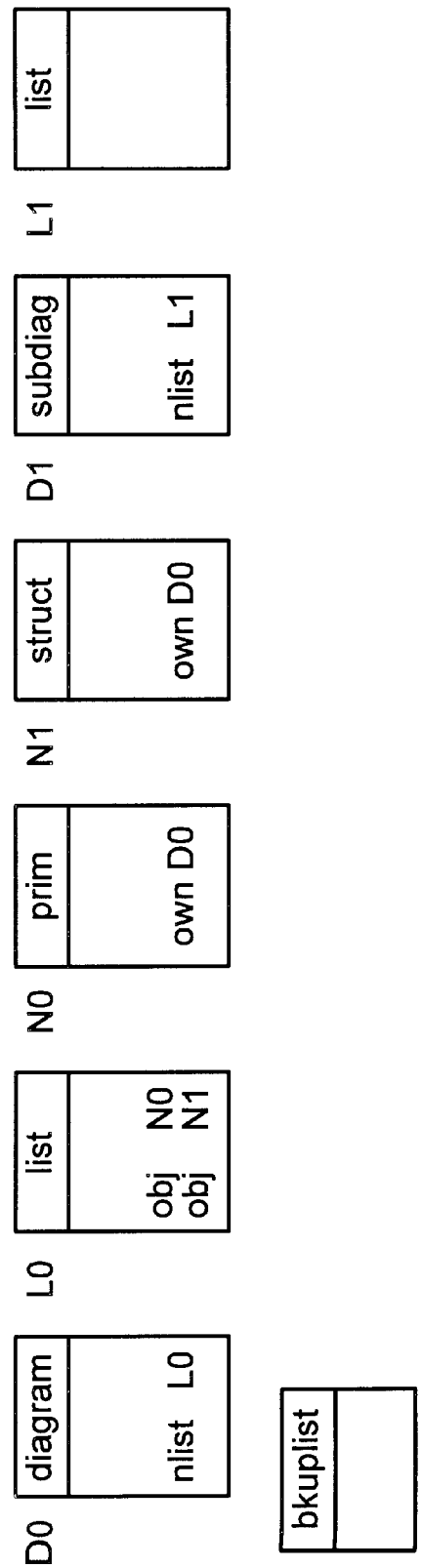
FIG. 11 illustrates the objects of interest at the start of the transaction of FIG. 10.

Consider a simple adopt & disavow example, moving a primitive into a structure, as shown in FIG. 10. At the start of the transaction the objects of interest are shown in FIG. 11.

The transaction proceeds as:

```
oDoit to the structure ("socket")
    oEditSelection to the root
        oEditSelection to the prim
            oAdopt to the structure's subdiagram with prim as arg
                Backup subdiagram & prim
                oDisavow to prim's owner (root) with prim as arg
                    Backup owner & prim
                    BkUpObjListDelete (Backup list)
                    BkUpObjListInsert (Backup list)
                    oMove to prim
                        Backup prim
```

Figure 12:
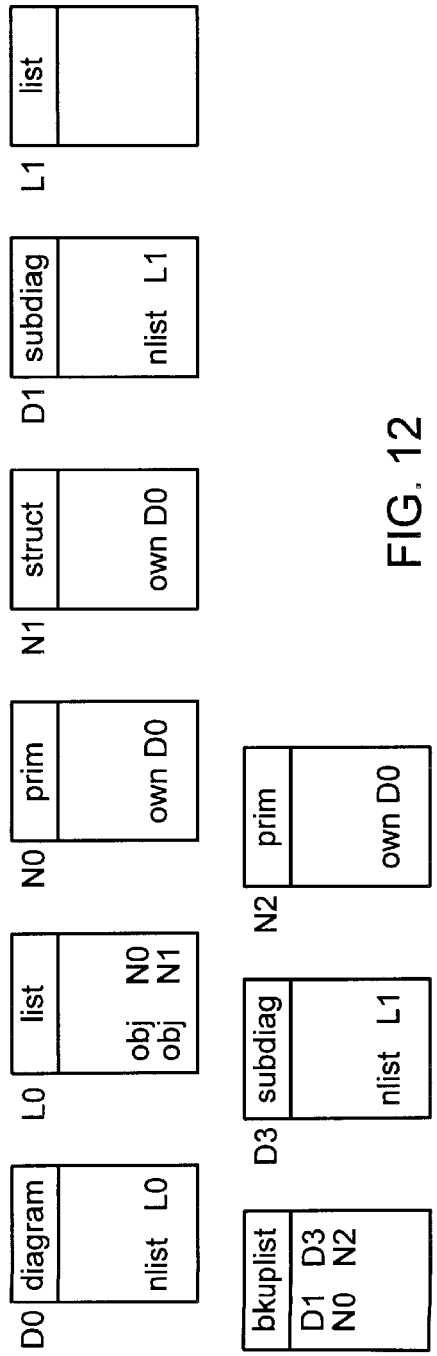
FIG. 12 illustrates the objects of FIG. 11 after the first step of the adopt backs up the subdiagram and prim.
Figure 13:
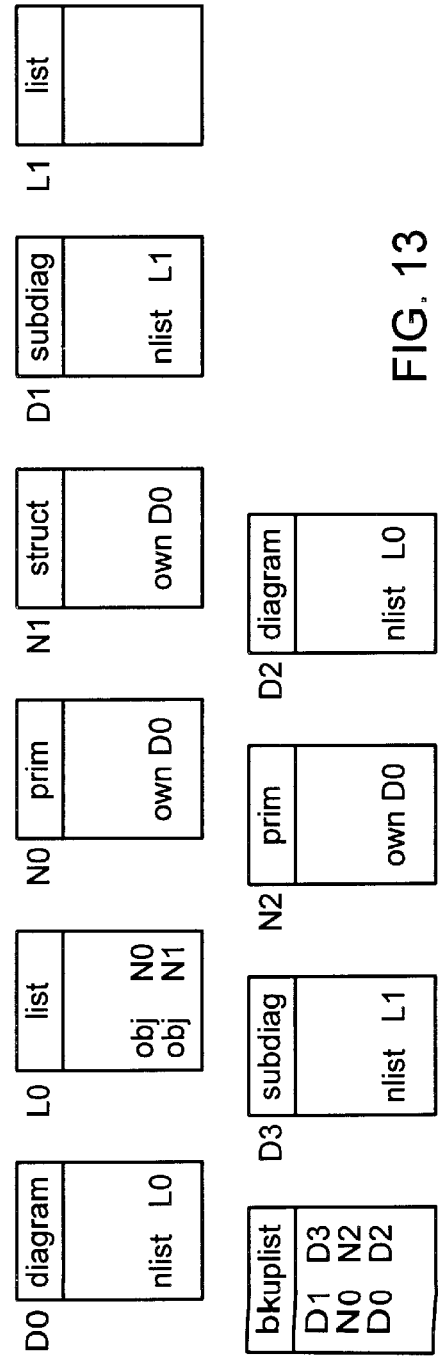
FIG. 13 illustrates the objects after the first step of the disavow backs up the owner and prim.
Figure 14:
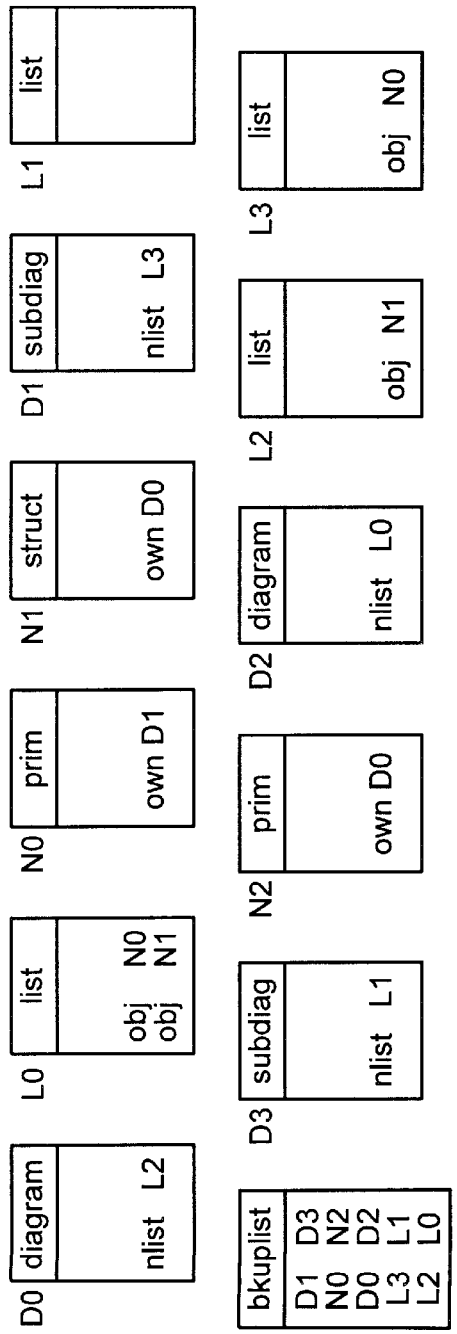
FIG. 14 illustrates the objects after the bkupobjlistdelete and bkupobjlistinsert functions are performed.
Figure 15:
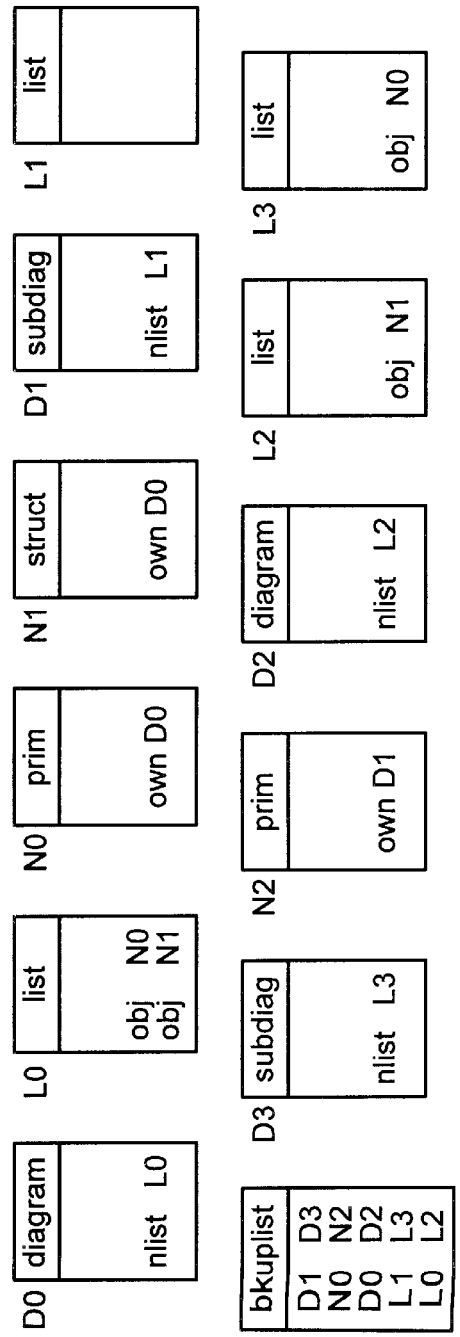
FIG. 15 illustrates the objects after UNDO is selected.

After the first step of the adopt backs up the subdiagram and prim the objects appear as shown in FIG. 12. After the first step of the disavow backs up the owner and prim the objects appear as shown in FIG. 13. After the bkupobjlistdelete and after the bkupobjlistinsert, the objects appear as shown in FIG. 14. After UNDO is performed, the objects appear as shown in FIG. 15.

EXAMPLE 2

Figure 16:
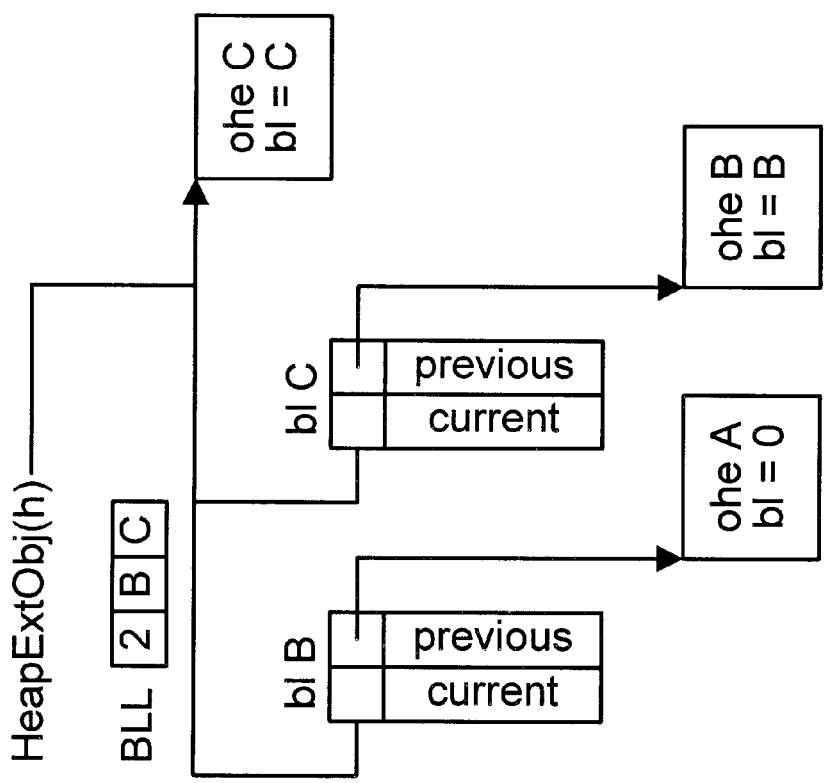
FIG. 16 illustrates a backup list after two transactions B and C.

FIG. 16 illustrates what the backup list looks like after two transactions, B and C. Each transaction has associated with it a backup list (bl) and an object heap extension (ohe). There is also the original object heap extension, ohe A, which existed before the first transaction. Each ohe points to a bl, and each bl has pointers to the current ohe and the previous ohe. It is noted that since the ohe is a fixed sized object, it is backed up by copying its contents to another location, then overwriting the current location, so the current heap extension never moves. Each bl's pointer to the current extension points to the same location, but the contents of that location change during each transaction.

Figure 17:
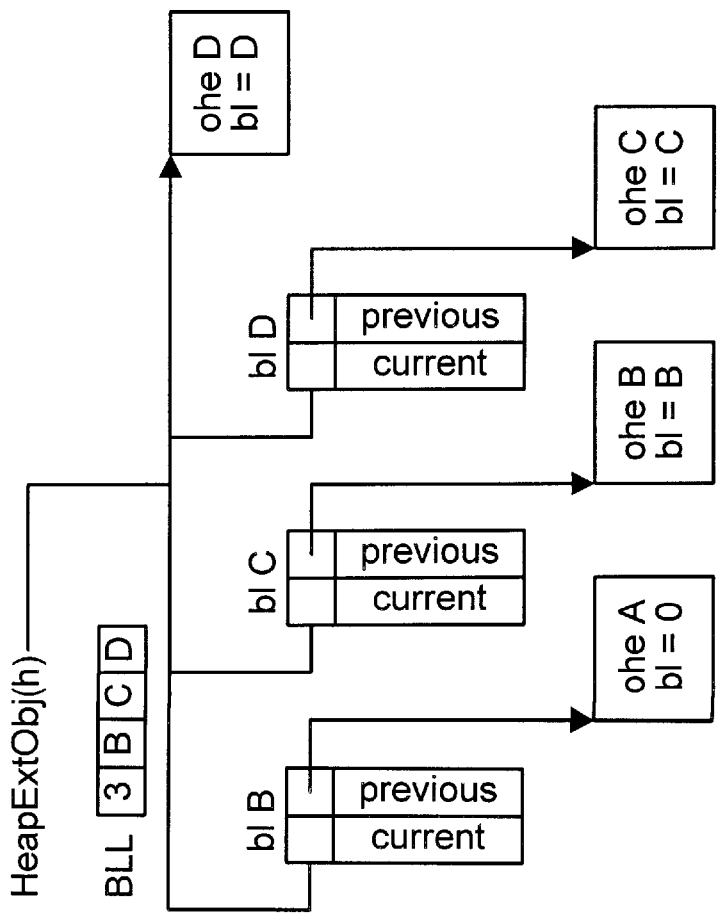
FIG. 17 illustrates a new backup list (D) that is created when the user initiates a new transaction.
Figure 19:
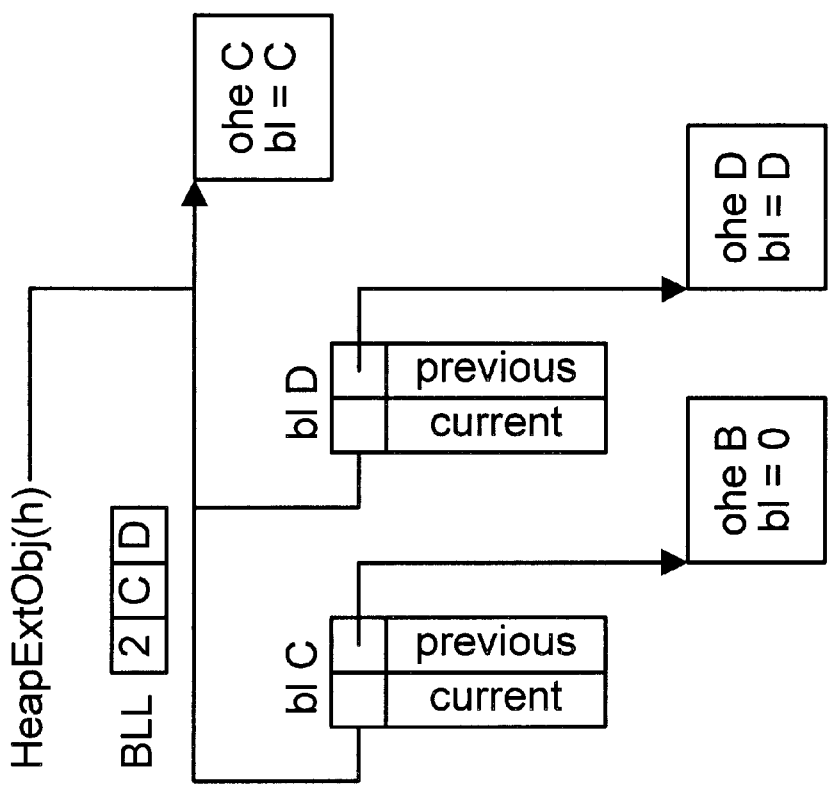
FIG. 19 illustrates the backup list when transaction D is undone.

New Transaction: As shown in FIG. 17, when the user initiates a new transaction, a new backup list (D) is created. The current heap extension is backed up to a new location which is pointed to by bl D. Then the current heap extension is overwritten by transaction D to point to bl D and have the correct action code for transaction D.

Figure 18:
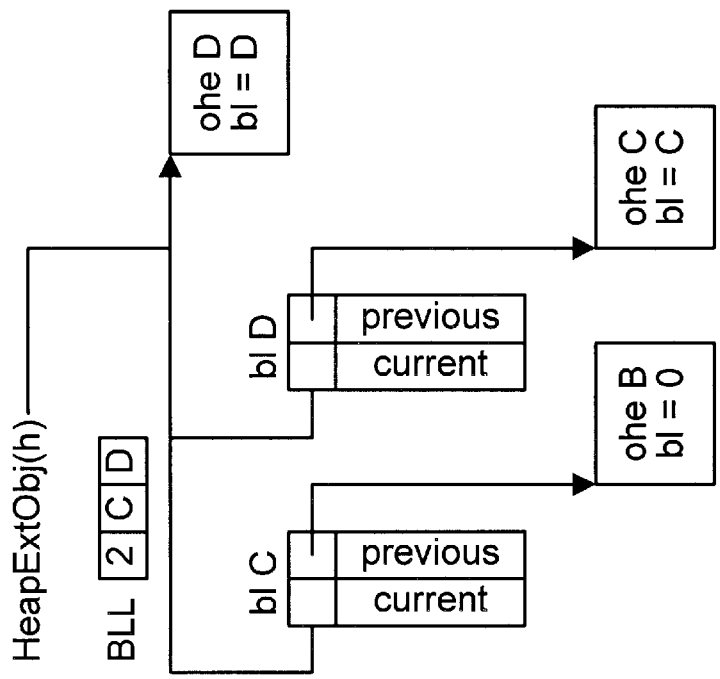
FIG. 18 illustrates the backup list when transaction B is committed.

Commit: As shown in FIG. 18, when transaction B is committed, its backup list is thrown away and its ohe's bl field is set to 0.

Undo: As shown, when transaction D is undone, the contents of its ohe (D) are swapped with the previous ohe (C). It is known that C is the current transaction, because the current heap extension has backup list C. Since D comes after C in the backup list list, it is known that D is the transaction that will be redone if the user selects "Redo". In that case, list D is swapped again. If the user were to undo list C, the current extension would be B, which doesn't have a backup list, meaning undo could not be performed anymore.

In the preferred embodiment, the undo/redo feature of the present invention operates on every object in the controls/functions palettes, and every object in the controls/functions palettes. Also, changing the type of a control on a subVI's connector pane purges undo on all of its callers. The same occurs when changing the type of a typedef or anything about a strict typedef and then applying changes. Also reverting the subVI or typedef updates purges undo on all of its callers and updates types correctly.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing undo in a graphical system, wherein the graphical system includes a plurality of interconnected objects, wherein said interconnected objects include fixed size objects and variable size objects, the method comprising:
   receiving user input which modifies an object;
   determining if the object is a fixed size object or a variable size object;
   backing up the object in a data structure in response to said user input which modifies the object, wherein the data structure includes one or more pairs each comprising a current element and a previous element, wherein, if the object is a fixed size object, said backing up the object comprises:
   creating a copy of the object;
   storing the copy of the object as the previous element in the data structure; and
   storing the object as the current element in the data structure, wherein the object remains a foreground object in the graphical system.

2. The method of claim 1, wherein the object is a fixed size object, the method further comprising:
   receiving user input to undo said modification to said object;
   undoing said modification to said object, wherein said undoing comprises swapping contents of the current and previous elements in the data structure.

3. The method of claim 1, wherein, if the object is a variable size object, said backing up the object comprises:
   storing the object as the previous element in the data structure;
   creating a copy of the object; and
   storing the copy of the object as the current element in the data structure wherein the copy of the object becomes the foreground object in the graphical system.

4. The method of claim 3, wherein the object is a variable size object, the method further comprising:
   receiving user input to undo said modification to said object;
   undoing said modification to said object, wherein said undoing comprises swapping the current and previous elements in the data structure.

5. The method of claim 1, wherein said determining if the object is a fixed size object or a variable size object comprises determining if the object is a type which changes in size in response to user modification.

6. The method of claim 1, wherein said determining if the object is a fixed size object or a variable size object comprises determining if the object changes in size in response to said receiving user input.

7. The method of claim 1, wherein a variable size object is an object which generally changes in size in response to user modification;
   wherein a fixed size object is an object which does not change in size in response to user modification.

8. The method of claim 1, wherein the object is stored in a first memory location prior to said receiving user input;
   wherein the object remains stored in said first memory location after said backing up the object in the data structure.

9. The method of claim 8, wherein the object is referenced by one or more other objects, wherein said one or more other objects each include a reference to the object;

wherein said references to the object are unbroken since the object remains stored in said first memory location after said backing up the object in the data structure;

wherein said one or more other objects are not required to be backed up since said references to the object are unbroken.

10. The method of claim 1, wherein the object is referenced by one or more other objects, wherein said one or more other objects each include a reference to the object;

wherein said storing the copy of the object as the previous element in the data structure and storing the object as the current object in the data structure causes said references to the object to be unbroken;

wherein said one or more other objects are not required to be backed up since said references to the object are unbroken.

11. The method of claim 1, further comprising:

determining if the object is required to be modified after said receiving user input and prior to said backing up the object;

wherein said backing up the object in the data structure is performed in response to determining that the object is required to be modified.

12. The method of claim 11, wherein the object is comprised in an object hierarchy, wherein the object hierarchy comprises a plurality of objects, the method further comprising:

constructing a message in response to said receiving user input, wherein said message includes an object path of the object and the action signified by the user input, wherein said constructing the message is performed after said receiving user input which modifies an object and prior to said determining if the object is required to be modified wherein said steps of determining if the object is required to be modified, determining if the object is a fixed size object or a variable size object, and backing up the object in a data structure are performed for each of said plurality of objects in the object hierarchy.

13. The method of claim 1, wherein the graphical system comprises a graphical programming system;

wherein said receiving user input which modifies an object is performed during creation of a graphical program in the graphical programming system.

14. A computer system which performs undo in a graphical system, the computer system comprising:

a CPU which executes code and data;

a memory coupled to the CPU which stores a plurality of interconnected objects, wherein said interconnected objects include fixed size objects and variable size objects;

a user input device for receiving user input which modifies an object;

a software program stored in the memory which performs undo operations, wherein the software program is executable by the CPU to determine if the object is a fixed size object or a variable size object;

a data structure stored in the memory of the computer system for storing backups of objects, wherein the data structure includes one or more pairs each comprising a current element and a previous element;

wherein the software program is further executable to back up the object in the data structure in response to said user input which modifies the object, wherein, if the object is a fixed size object, the software program is executable to create a copy of the object, store the copy of the object as the previous element in the data structure, and store the object as the current element in the data structure, wherein the object remains a foreground object in the graphical system.

15. The computer system of claim 14, wherein the object is a fixed size object;

wherein the user input device is operable to receive user input to undo said modification to said object;

wherein the software program is further executable to undo said modification to said object by swapping contents of the current and previous elements in the data structure.

16. The computer system of claim 14, wherein, if the object is a variable size object, the software program is executable to store the object as the previous element in the data structure, create a copy of the object, and store the copy of the object as the current element in the data structure, wherein the copy of the object becomes the foreground object in the graphical system.

17. The computer system of claim 16, wherein the object is a variable size object;

wherein the user input device is operable to receive user input to undo said modification to said object;

wherein the software program is further executable to undo said modification to said object by swapping the current and previous elements in the data structure.

18. The computer system of claim 14, wherein the software program determines if the object is a fixed size object or a variable size object by determining if the object is a type which changes in size in response to user modification.

19. The computer system of claim 14, wherein the software program determines if the object is a fixed size object or a variable size object by determining if the object changes in size in response to said receiving user input.

20. The computer system of claim 14, wherein a variable size object is an object which generally changes in size in response to user modification;

wherein a fixed size object is an object which does not change in size in response to user modification.

21. The computer system of claim 14, wherein the object is stored in a first memory location in said memory prior to said receiving user input;

wherein the object remains stored in said first memory location in said memory after the object is backed up in the data structure.

22. The computer system of claim 21, wherein the memory stores one or more other objects which reference said object, wherein said one or more other objects each include a reference to the object;

wherein said references to the object are unbroken since the object remains stored in said first memory location after said backing up the object in the data structure;

wherein said one or more other objects are not required to be backed up since said references to the object are unbroken.

23. The computer system of claim 14, wherein the memory stores one or more other objects which reference said object, wherein said one or more other objects each include a reference to said object;

wherein said software program operates to store the copy of the object as the previous element in the data structure and store the object as the current object in the data structure to cause said references to the object to be unbroken;

wherein said one or more other objects are not required to be backed up since said references to the object are unbroken.

24. A memory media which store program instructions for performing undo in a graphical system, wherein the graphical system includes a plurality of interconnected objects, wherein said interconnected objects include fixed size objects and variable size objects, wherein the program instructions are executable to implement the steps of:

receiving user input which modifies an object;

determining if the object is a fixed size object or a variable size object;

backing up the object in a data structure in response to said user input which modifies the object, wherein the data structure includes one or more pairs each comprising a current element and a previous element, wherein, if the object is a fixed size object, said backing up the object comprises:

creating a copy of the object;

storing the copy of the object as the previous element in the data structure; and storing the object as the current element in the data structure, wherein the object remains a foreground object in the graphical system.

25. The memory media of claim 24, wherein the object is a fixed size object, wherein the program instructions are further executable to implement the steps of:

receiving user input to undo said modification to said object;

undoing said modification to said object, wherein said undoing comprises swapping contents of the current and previous elements in the data structure.

26. The memory media of claim 24, wherein, if the object is a variable size object, said backing up the object comprises:

storing the object as the previous element in the data structure;

creating a copy of the object; and storing the copy of the object as the current element in the data structure, wherein the copy of the object becomes the foreground object in the graphical system.

27. The memory media of claim 26, wherein the object is a variable size object, wherein the program instructions are further executable to implement the steps of:

receiving user input to undo said modification to said object;

undoing said modification to said object, wherein said undoing comprises swapping the current and previous elements in the data structure.

28. The memory media of claim 24, wherein said determining if the object is a fixed size object or a variable size object comprises determining if the object is a type which changes in size in response to user modification.

29. The memory media of claim 24, wherein said determining if the object is a fixed size object or a variable size object comprises determining if the object changes in size in response to said receiving user input.

30. The memory media of claim 24, wherein a variable size object is an object which generally changes in size in response to user modification;

wherein a fixed size object is an object which does not change in size in response to user modification.

31. The memory media of claim 24, wherein the object is stored in a first memory location prior to said receiving user input;

wherein the object remains stored in said first memory location after said backing up the object in the data structure.

32. The memory media of claim 31, wherein the object is referenced by one or more other objects, wherein said one or more other objects each include a reference to the object;

wherein said references to the object are unbroken since the object remains stored in said first memory location after said backing up the object in the data structure;

wherein said one or more other objects are not required to be backed up since said references to the object arc unbroken.

33. The memory media of claim 24, wherein the object is referenced by one or more other objects, wherein said one or more other objects each include a reference to the object;

wherein said storing the copy of the object as the previous element in the data structure and storing the object as the current object in the data structure causes said references to the object to be unbroken;

wherein said one or more other objects are not required to be backed up since said references to the object are unbroken.

* * * * *